(12) United States Patent
Kurumizawa et al.

(10) Patent No.: US 8,845,354 B2
(45) Date of Patent: Sep. 30, 2014

(54) LOCK DEVICE

(71) Applicant: Kabushiki Kaisha Tokai Rika Denki Seisakusho, Aichi (JP)

(72) Inventors: Naoto Kurumizawa, Aichi (JP); Keiji Kahara, Aichi (JP); Toshiharu Katagiri, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 42 days.

(21) Appl. No.: 13/836,270

(22) Filed: Mar. 15, 2013

(65) Prior Publication Data

US 2013/0260597 A1     Oct. 3, 2013

(30) Foreign Application Priority Data

Mar. 29, 2012   (JP) ................. 2012-077052

(51) Int. Cl.
*H01R 13/639* (2006.01)
*B60L 11/18* (2006.01)

(52) U.S. Cl.
CPC ........... *H01R 13/639* (2013.01); *Y02T 10/7088* (2013.01); *B60L 11/1818* (2013.01); *Y02T 90/14* (2013.01); *Y02T 10/7005* (2013.01); *Y02T 90/121* (2013.01)
USPC ....................................... 439/347

(58) Field of Classification Search
USPC ................. 439/347, 372, 157, 352, 527–528, 439/357–358, 304
See application file for complete search history.

(56) References Cited

U.S. PATENT DOCUMENTS

| | | | |
|---|---|---|---|
| 8,025,526 B1 * | 9/2011 | Tormey et al. | 439/528 |
| 8,251,734 B2 * | 8/2012 | Katagiri et al. | 439/352 |
| 8,439,699 B2 * | 5/2013 | Ohmura | 439/372 |
| 8,460,028 B2 * | 6/2013 | Tormey et al. | 439/528 |
| 2008/0182447 A1 * | 7/2008 | Lutsch et al. | 439/347 |
| 2011/0300736 A1 * | 12/2011 | Katagiri et al. | 439/347 |

FOREIGN PATENT DOCUMENTS

JP       2011-243500       12/2011

* cited by examiner

*Primary Examiner* — Jean F Duverne
(74) *Attorney, Agent, or Firm* — Greenblum & Bernstein, P.L.C.

(57) ABSTRACT

A lock device includes a helical gear driven by a motor. The helical gear is connected to a control shaft by a transmission member. Further, the helical gear is connected to a lid lock bar by a link bar. A coil spring constantly urges the lid lock bar toward a lid lock position.

9 Claims, 16 Drawing Sheets

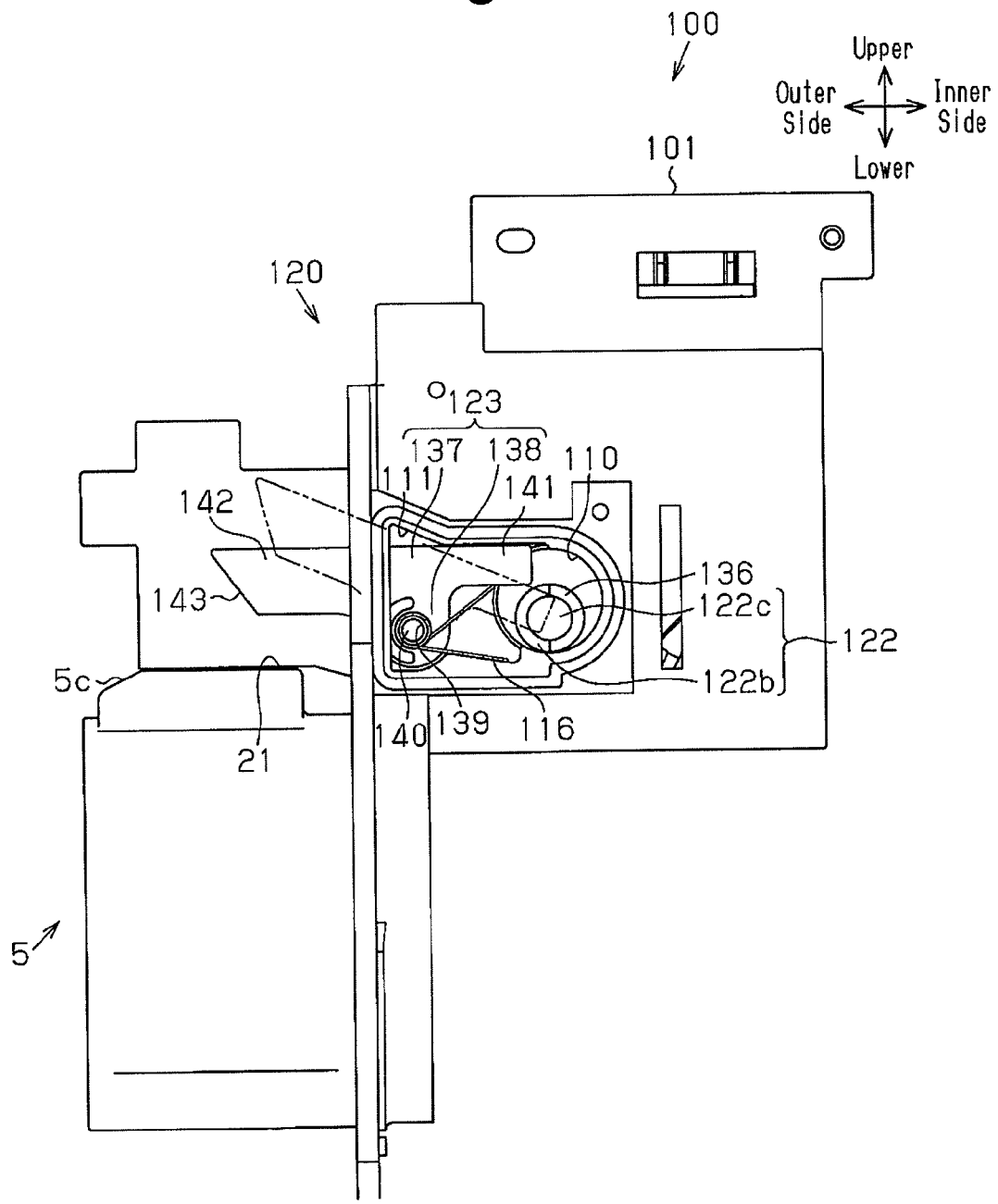

Fig.12A
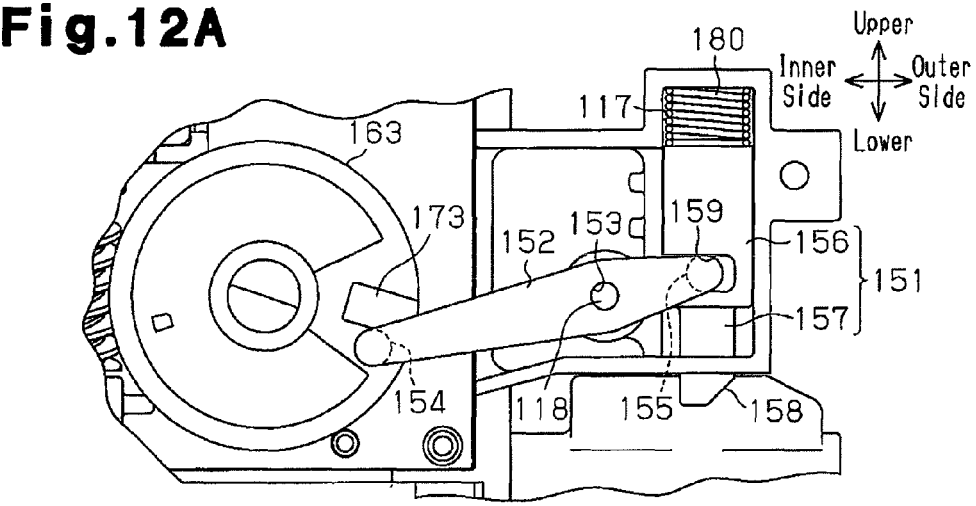
Fig.12B    Fig.12C
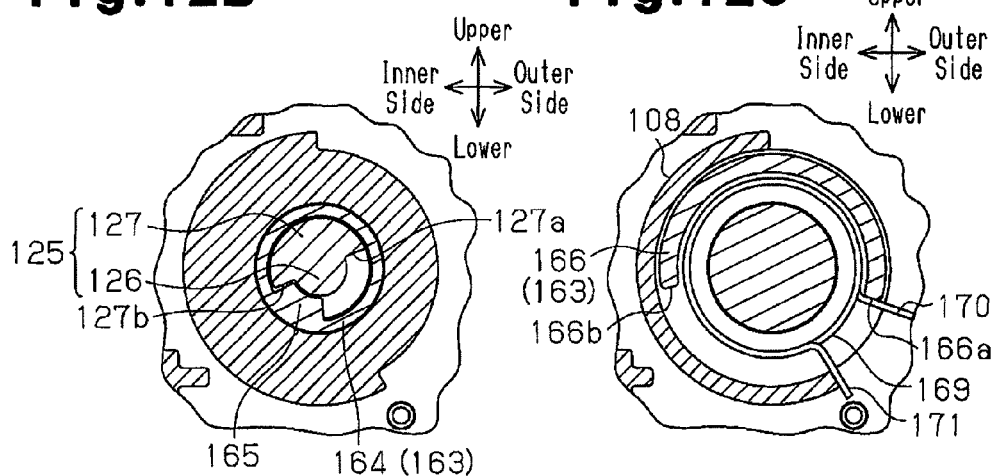
Fig.12D
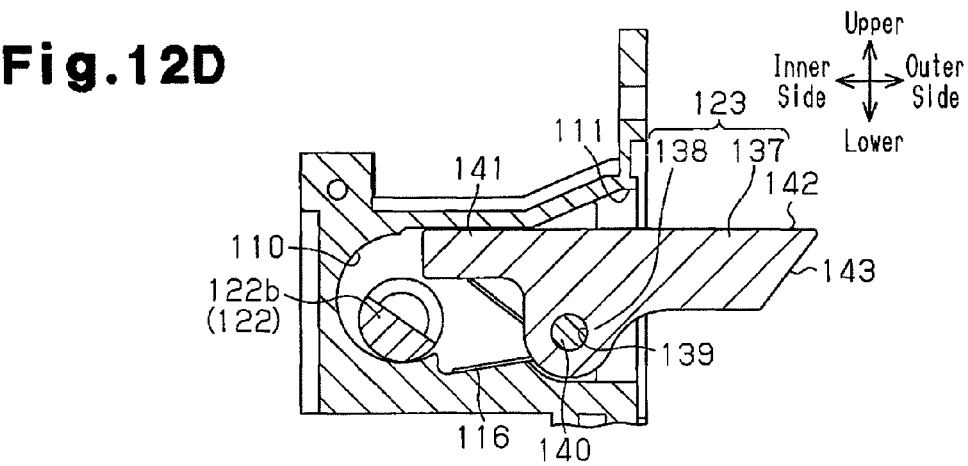

LOCK DEVICE

CROSS-REFERENCE TO RELATED APPLICATIONS

This application is based upon and claims the benefit of priority from prior Japanese Patent Application No. 2012-077052, filed on Mar. 29, 2012, the entire contents of which are incorporated herein by reference.

BACKGROUND ART

The present invention relates to a lock device that restricts removal of a power supplying plug from a power reception connector.

Japanese Laid-Open Patent Publication No. 2011-243500 describes one example of a lock device. The lock device restricts removal of a power supplying plug from a power reception connector (inlet), which is accommodated in an inlet accommodation portion of a vehicle. In addition, the lock device restricts movement of a lid, which closes the inlet accommodation portion, and functions to prevent the power reception connector from being accessed.

The lock device includes a hook lock bar and a lid lock bar. The hook lock bar moves between a hook lock position and a hook unlock position. The lid lock bar moves between a lid lock position and a lid unlock position.

When the hook lock bar is located at the hook unlock position, the hook lock bar restricts movement of a hook of the power supplying plug, which is connected to the inlet and engaged with a hook seat of the inlet. When the hook lock bar is located at the hook unlock position, the hook is unlocked and is able to be disengaged from the hook seat. This permits movement of the hook.

When the lid lock bar is located at the lid lock position, the lid lock bar is received in a lid hole of the lid thereby restricting opening of the lid. When the lid lock bar is located at the lid unlock position, the lid lock bar is separated from the lid hole thereby permitting opening of the lid.

The hook lock bar and the lid lock bar are moved in cooperation with the rotation of rotating bodies driven by the same motor. Accordingly, when the motor rotates the rotating bodies, the hook lock bar moves between the hook lock position and the hook unlock position. Simultaneously, the lid lock bar is moved between the lid lock position and the lid unlock position.

When the power supplying plug is connected to the inlet and the hook lock bar is located in the hook lock position, the hook is held on the hook seat. This restricts removal of the power supplying plug from the inlet. When the inlet accommodation portion is closed by the lid and the lid lock bar is located at the lid lock position, the lid lock bar is held in the lid hole. This restricts opening of the lid.

To open the lid, the lock device always drives the motor to move the lock bar to the lid unlock position. When the inlet accommodation portion is closed by the lid, the lock device also drives the motor to move the lid lock bar from the lid unlock position to the lid lock position. In both cases, it takes time for the motor to drive and complete the movement of the lid lock bar. Thus, the lock device is inconvenient.

It is an object of the present invention to provide a lock device that locks a power supplying plug and a lid with the same drive source and is easy to use.

SUMMARY

One aspect of the present invention is a lock device that locks a lid and a power supplying plug. The lid protects a power reception connector. The lock device includes a plug restriction member that moves between a plug lock position and a plug unlock position. The plug restriction member restricts removal of the power supplying plug from the power reception connector at the plug lock position, and the plug restriction member permits removal of the power supplying plug from the power reception connector at the plug unlock position. A lid restriction member moves between a lid lock position and a lid unlock position. The lid restriction member engages the lid and restricts opening of the lid at the lid lock position. The lid restriction member permits opening of the lid at the lid unlock position, and the lid restriction member is constantly urged toward the lid lock position. A drive mechanism includes a drive source and a rotating body. The drive source generates drive force and rotates the rotating body in first and second directions from a reference position. A recovery mechanism is connected to or formed integrally with the rotating body to return the rotating body to the reference position when the rotating body rotates in the second direction. The drive mechanism is directly or indirectly connected to the plug restriction member to move the plug restriction member from the plug unlock position to the plug lock position when the rotating body rotates from the reference position in the first direction. The drive mechanism is directly or indirectly connected to the lid restriction member to move the lid restriction member from the lid lock position to the lid unlock position against an urging force acting on the lid restriction member when the rotating body rotates from the reference position in the second direction. When closing the lid with the lid restriction member held at the lid lock position, the lid restriction member engages the closing lid and moves toward the unlock position thereby permitting the lid to close. The lid restriction member is formed to be returned to the lid lock position by the urging force at a timing at which the lid reaches a close position.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

The invention, together with objects and advantages thereof, may best be understood by reference to the following description of the presently preferred embodiments together with the accompanying drawings in which:

FIG. 10 is a right side view of the lock device;

FIG. 12A is a left side view of the lid lock mechanism when the lock device is in a second state;

FIG. 12B is a cross-sectional view showing the transmission member and the control shaft engaged with each other when the lock device is in the second state;

FIG. 12C is a cross-sectional view showing the locations of the two ends of the first torsion spring when the lock device is in the second state;

FIG. 12D is a cross-sectional view showing the hook lock bar restriction portion and the hook lock bar engaged with each other when the lock device is in the second state;

DETAILED DESCRIPTION OF EMBODIMENTS

Figure 6:
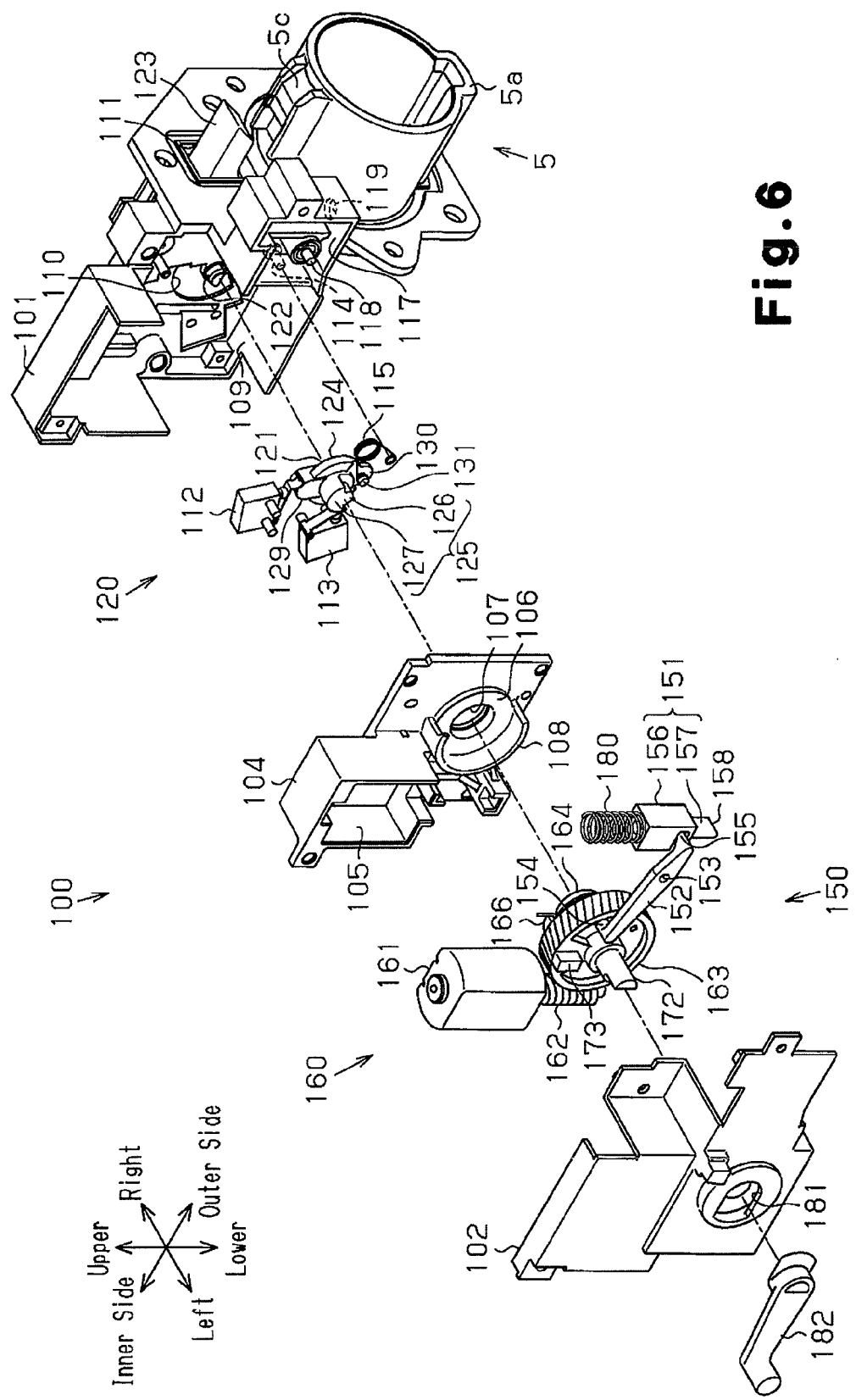
FIGS. 6 and 7 are exploded perspective views of the lock device.
Figure 7:
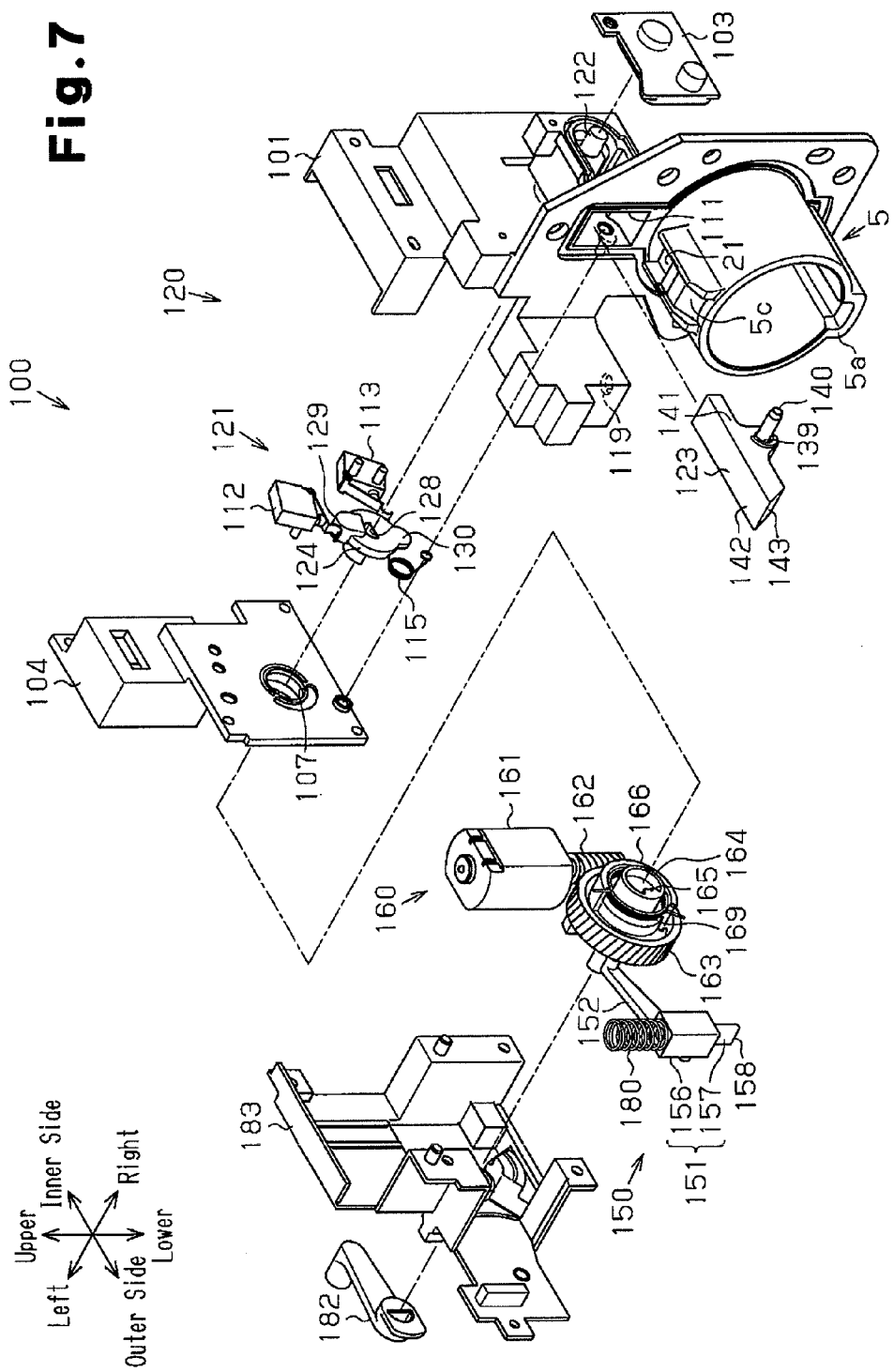

In the description hereafter, to facilitate understanding, directions and positional relationships will be used referring to the coordinate system showing in FIGS. 6 and 7.

Figure 1:
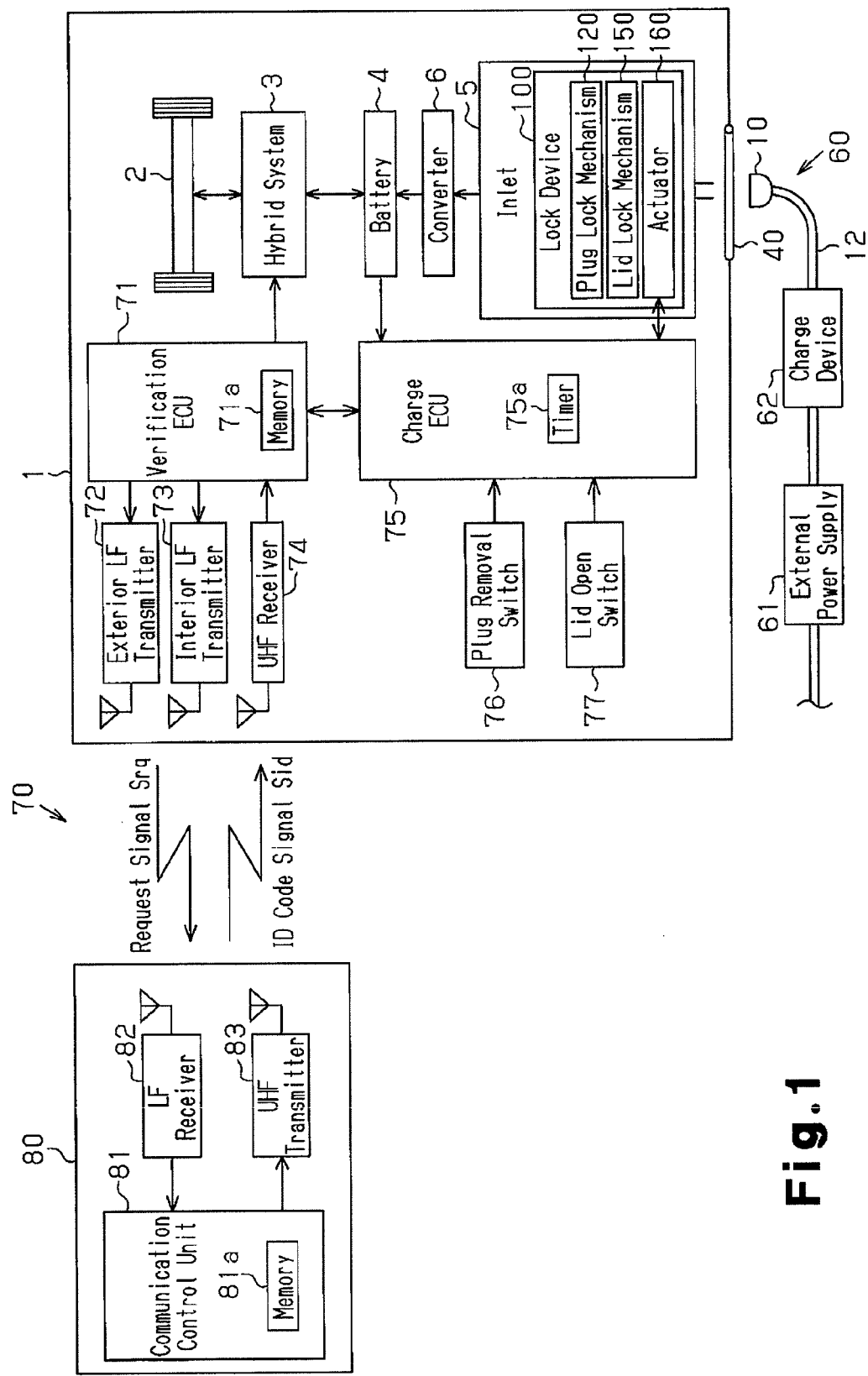
FIG. 1 is a schematic block diagram of a charge system and an electronic key system according to one embodiment of the present invention.

A lock device according to one embodiment of the present invention may be arranged in a vehicle 1, such as a plug-in hybrid vehicle. As shown in FIG. 1, the vehicle includes a hybrid system 3 that combines the drive forces of an engine and a travel motor to rotate drive wheels 2. A battery 4 is connected to the hybrid system 3.

The hybrid system 3 switches traveling modes in accordance with the travel state of the vehicle or the like. The travel modes include a mode for driving the drive wheels 2 with only the power of the engine, a mode for driving the drive wheels 2 with both of the engine and the travel motor, and a mode for driving the drive wheels 2 with only the travel motor. The hybrid system 3 also switches charging modes in accordance with the travel state of the vehicle or the like. The charging modes include a mode for charging the battery 4 with the power of the engine and a mode for charging the battery with the power obtained by converting the braking force of the drive wheels 2 with the travel motor. The vehicle 1 travels and charges the travel motor in accordance with the travel mode and the charge mode switched by the hybrid system.

The battery 4 is connected to an inlet 5 by a converter 6. The inlet 5 functions as a power reception connector that receives a power supplying plug 10, which is connected to an external power supply 61 (AC power supply) by a charge device 62. In the example shown in FIG. 4, the inlet 5 is arranged in an inlet accommodation portion 1a arranged in a side surface of the vehicle 1. The inlet accommodation portion 1a includes an opening 1b that may be closed by a movable lid 40. Referring to FIG. 1, when the power supplying plug 10 is connected to the inlet 5, the charge device 62 transmits a connection signal to the vehicle 1. The converter 6 converts AC voltage, which is supplied from the power supplying plug 10 via the inlet 5, to DC voltage, and supplies the converted DC voltage to the battery 4. In this manner, the battery 4 is charged by the external power supply 61.

The vehicle 1 includes an electronic key system 70 that executes vehicle control allowing, for example, automatic locking and unlocking of vehicle doors without the need for a user to operate a vehicle key. The electronic key system 70 executes the vehicle control through wireless communication performed between the vehicle 1 and an electronic key 80, which serves as an electronic key held by the user.

The electronic key system 70 will now be described. The vehicle 1 includes a verification ECU 71 connected to an exterior low frequency (LF) transmitter 72, an interior LF transmitter 73, and an ultrahigh frequency (UHF) receiver 74. The exterior LF transmitter 72 is arranged in each door of the vehicle 1 and transmits a signal on the LF band. The interior LF transmitter 73 is arranged in the vehicle floor and transmits a wireless signal on the LF band. The UHF receiver 74 is arranged in a rear portion of the vehicle body and transmits a wireless signal on the UHF band. The verification ECU 71 includes a memory 71a, which stores, in advance, a unique ID code corresponding to the electronic key 80.

The electronic key 80 includes a communication control unit 81 connected to an LF receiver 82 and a UHF transmitter 83. The LF receiver 82 receives a signal on the LF band. The UHF transmitter 83 transmits a signal on the UHF band in accordance with a command from the communication control unit 81. The communication control unit 81 includes a memory 81a, which stores, in advance, a unique ID code of the electronic key 80.

The verification ECU 71 intermittently and repeatedly transmits a request signal Srq from the exterior LF transmitter 72 at a controlled timing to form a communication area around the vehicle 1. When the electronic key 80 enters the communication area and the LF receiver 82 receives the request signal Srq, the communication control unit 81 returns an ID code signal Sid in response from the UHF transmitter 83. The ID code signal Sid includes the ID code registered in the memory 81a. When the UHF receiver 74 receives the ID code signal Sid, the verification ECU 71 verifies the ID code of the electronic key 80 with the ID code registered in the memory 71a (exterior verification). When the exterior verification is accomplished, the verification ECU 71 permits or performs the unlocking of the vehicle doors with a door locking device (not shown).

When the vehicle doors are unlocked after the exterior verification is accomplished, the verification ECU 71 transmits the request signal Srq from the interior LF transmitter 73 and forms an interior communication area in the vehicle, preferably in the entire vehicle. When the user who is carrying the electronic key 80 enters the interior communication area and the LF receiver 82 receives the request signal, the communication control unit 81 returns an ID code signal Sid in response from the UHF transmitter 83. The ID code signal Sid includes the ID code registered in the memory 81a. When the UHF receiver 74 receives the ID code signal Sid, the verification ECU 71 verifies the ID code of the electronic key 80 with the ID code registered in the memory 71a (interior verification). When the interior verification is accomplished, the verification ECU 71 permits the hybrid system 3 to start operating.

In one example, the electronic key system 70 further performs ID code verification when charging the battery 4 with the external power supply 61. The vehicle 1 includes a charge ECU 75 that controls charging. The charge ECU 75 is connected by an in-vehicle local area network (LAN) to the verification ECU 71 in a communicable manner. This allows the charge ECU 75 to check the ID verification result of the verification ECU 71. The charge ECU 75 is electrically connected to a plug removal switch 76 and a lid open switch 77, which are arranged in the vehicle. Further, the charge ECU 75 is electrically connected to a lock device 100, which is arranged in the inlet 5. The lock device 100 includes a plug lock mechanism 120, which is switched between a plug lock state and a plug unlock state. In the plug lock state, the plug lock mechanism 120 restricts movement of the power supplying plug 10 in the directions in which the power supplying plug 10 is fitted to and removed from the inlet 5. In the plug unlock state, the plug lock mechanism 120 permits movement of the power supplying plug 10 in the directions in which the power supplying plug 10 is fitted to and removed from the inlet 5. The lock device 100 also includes a lid lock mechanism 150, which is switched between a lid lock state and a lid unlock state. In the lid lock state, the lid lock mechanism 150 restricts movement of the lid 40 in the direction the lid 40 opens. In the lid unlock state, the lid lock mechanism 150 permits such movement of the lid 40. Further, the lock device 100 includes an actuator 160. The actuator 160 switches the plug lock mechanism 120 between the plug lock state and the plug unlock state and switches the lid lock mechanism 150 between the lid lock state and the lid unlock state. The actuator 160 is one example of a drive mechanism.

The charge ECU 75 switches the plug lock mechanism 120 between the plug lock state and the plug unlock state in accordance with the result of an exterior verification Performed in response to the operation of the plug removal switch 76. For example, if the plug removal switch 76 is operated when the power supplying plug 10 is disconnected from the inlet 5 and the plug lock mechanism 120 is in the plug lock state, the charge ECU 75 switches the plug lock mechanism 120 to the plug unlock state after determining that the verification ECU 71 has accomplished vehicle exterior verification. This permits connection of the power supplying plug 10 to the inlet 5. When the charge ECU 75 receives a connection signal from the charge device 62 indicating that the power supplying plug 10 has been connected to the inlet 5, the charge ECU 75 controls the converter 6 to start charging the battery 4 with power from the external power supply 61 and switches the plug lock mechanism 120 to the plug lock state. To disconnect the power supplying plug 10 from the inlet 5, the user operates the plug removal switch 76 again. If the plug removal switch 76 is operated, the charge ECU 75 switches the plug lock mechanism 120 to the plug unlock state after determining that the verification ECU 71 has accomplished vehicle exterior verification. This permits disconnection of the power supplying plug 10 from the inlet 5. A person who is not carrying the electronic key 80 is prevented from switching the plug lock mechanism 120 from the lock state to the unlock state. Thus, such a person cannot remove the power supplying plug 10 from the inlet 5 and steal electricity or the power supplying plug 10. In a preferred example, the exterior communication area is formed around the entire vehicle. Thus, when the user who is carrying the electronic key 80 stands by the inlet 5 arranged in, for example, a front side surface of the vehicle, vehicle exterior verification is performed without any problems.

In the preferred example, the charge ECU 75 includes a timer 75a, which is activated when the lid open switch 77 is operated. The timer 75a remains active for a predetermined activation period from when the timer 75a is activated. During the active period, the timer 75a drives the actuator 160. The active period of the timer 75a is preferably the shortest time required to switch the lid lock mechanism 150 from the lid lock state to the lid unlock state. When the lid open switch 77 is operated, the charge ECU 75 checks the ID verification result of the verification ECU 71 in the same manner as when the plug removal switch 76 is operated. When the ID verification has been accomplished, the charge ECU 75 drives the actuator 160 and switches the lid lock mechanism 150 to the lid unlock state. The structure of the lock device 100 will be described later.

Figure 2:
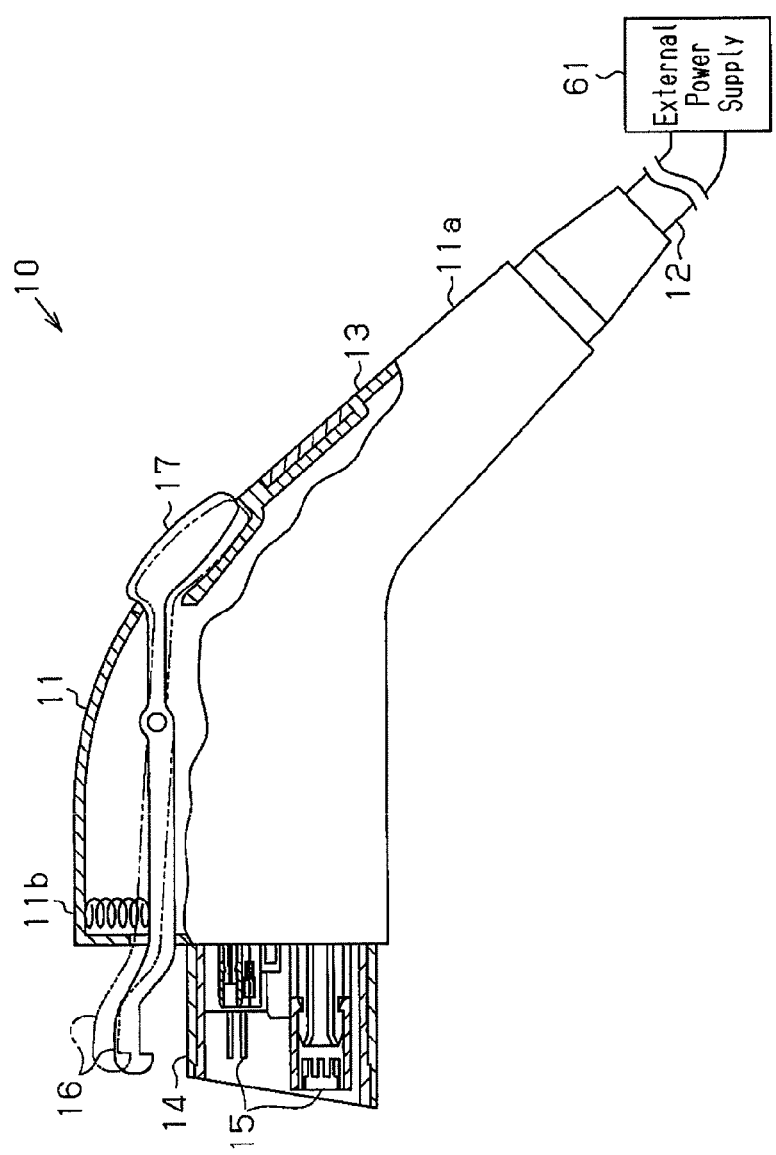
FIG. 2 is a partial cross-sectional view of a power supplying plug.

In the example shown in FIG. 2, the power supplying plug 10 includes a plug body 11 having a basal end 11a connected to a cable 12, which leads to the external power supply 61. The plug body 11 includes a grip 13, which is grasped by the user. The plug body 11 has a distal end 11b that forms a cylindrical power supplying end 14. Connection terminals 15 are arranged in the power supplying end 14. The connection terminals 15 include a power terminal, which forms a power transmission line, and control terminals, which form communication lines for control commands.

A hook 16 is arranged above the power supplying end 14. When the power supplying plug 10 is connected to the inlet 5, the hook 16 is engaged with part of the inlet 5 to keep the power supplying plug 10 and the inlet 5 connected. The plug body 11 pivotally supports the hook 16. The hook 16 is moved between a first position, which is shown by solid lines in FIG. 2, and a second position, which is shown by broken lines in FIG. 2. When the power supplying plug 10 is connected to the inlet 5, the hook 16 is engaged with part of the inlet 5 at the first position and disengaged from the inlet at the second position. Disengagement of the hook 16 from the inlet 5 allows the power supplying plug 10 to be removed from the power supplying plug 10. In the illustrated example, the hook 16 is normally held at the first position in an elastic manner. When a lever 17, which is coupled to the hook 16, is pushed, the hook 16 is moved to the second position (tilted position). When the lever 17 is released, the hook 16 elastically returns to the first position.

Figure 3:
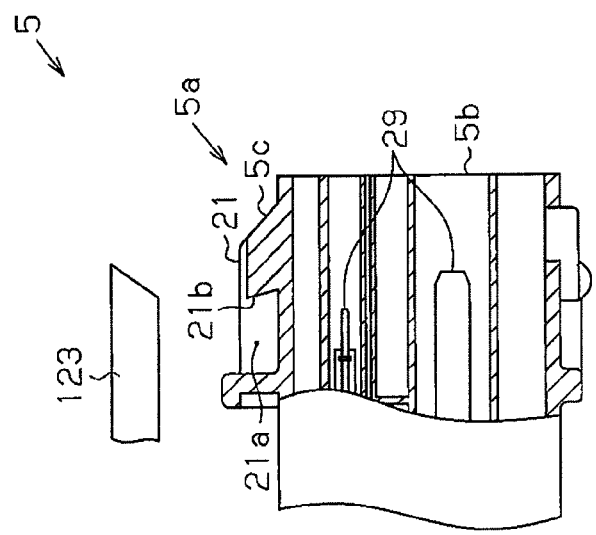
FIG. 3 is a cross-sectional view of an inlet and a lock device.

As shown in FIG. 3, the inlet 5 includes an inlet body 5a. The inlet body 5a of the inlet 5 includes a cylindrical power reception end 5*b*, which receives the power supplying end 14 of the power supplying plug 10. The power reception end 5*b* includes connection terminals 29. The connection terminals 29 include a power terminal, which forms a power transmission line, and control terminals, which form communication lines for control commands. When the power supplying plug 10 is connected to the inlet 5, the power terminals of the power reception end 5*b* and the power supplying end 14 are connected. Further, the control terminals of the power reception end 5*b* and the power supplying end 14 are connected.

Further, referring to FIG. 3, a hook seat 21, which may be engaged with the hook 16, is formed on the upper peripheral surface of the inlet body 5*a*. The hook seat 21 includes a slope 5*c* formed at a distal side (plug side). The hook seat 21 includes a groove, or recess 21*a*, that receives the hook 16 and allows the hook 16 to tilt. The recess 21*a* includes an inner surface 21*b* located at the plug side. Engagement of the hook 16 with the inner surface 21*b* restricts removal of the power supplying plug 10 from the inlet 5.

Figure 4:
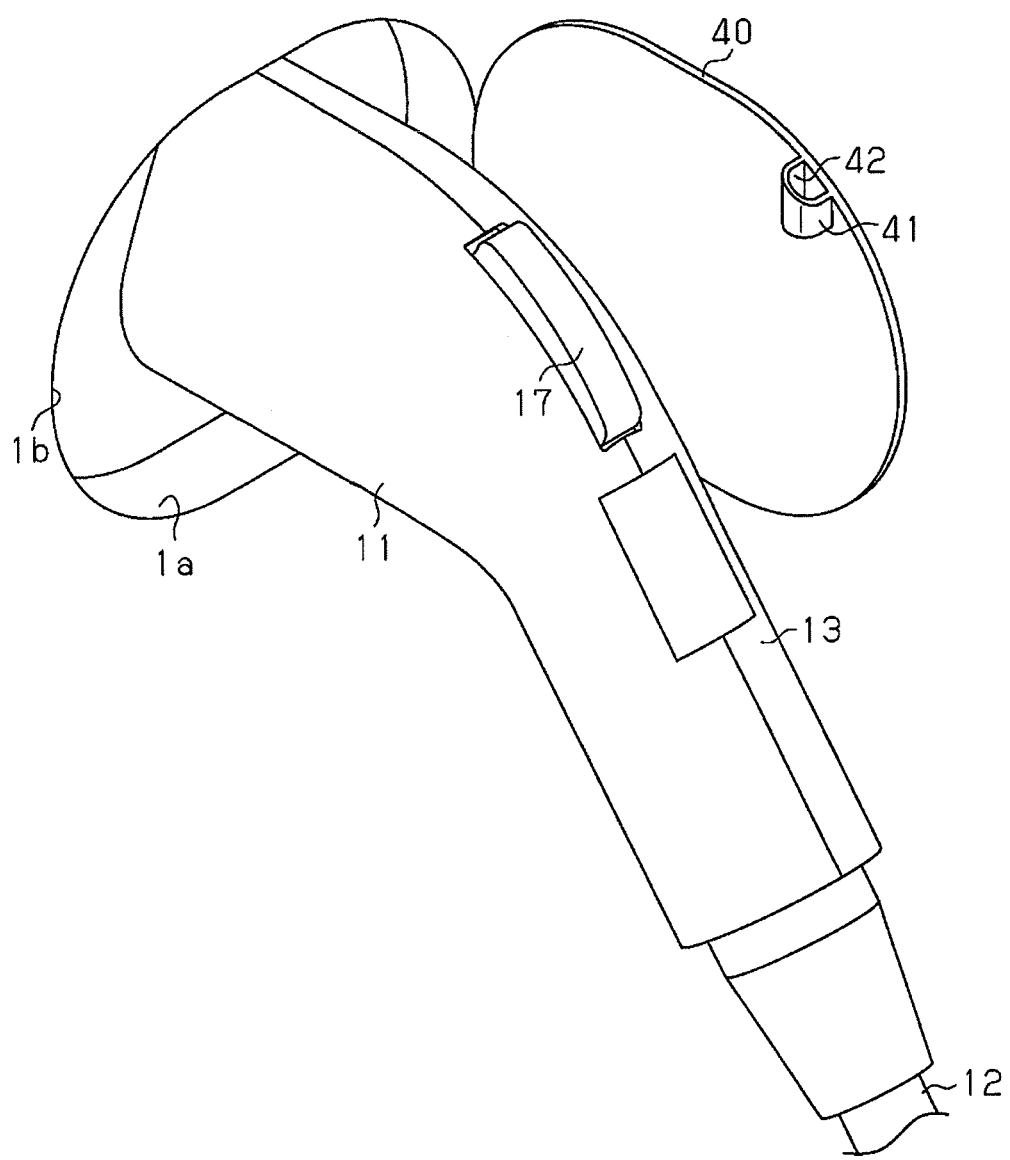
FIG. 4 is a perspective view of an inlet accommodation portion.

Referring to FIG. 4, the inlet accommodation portion 1*a* is closed by the lid 40, which may be supported by a hinge. The lid 40 includes an outer surface that forms part of the outer surface of the vehicle 1. The lid 40 protects the inlet 5 from the ambient environment. The lid 40 includes a latch hole 42. In the illustrated example, the latch hole 42 is an opening vertically extending through a generally U-shaped plate 41, which is fixed to the inner surface of the lid 40. Preferably, an urging member (not shown) constantly urges the lid 40 in an opening direction.

The lock device 100 will now be described.

Figure 5:
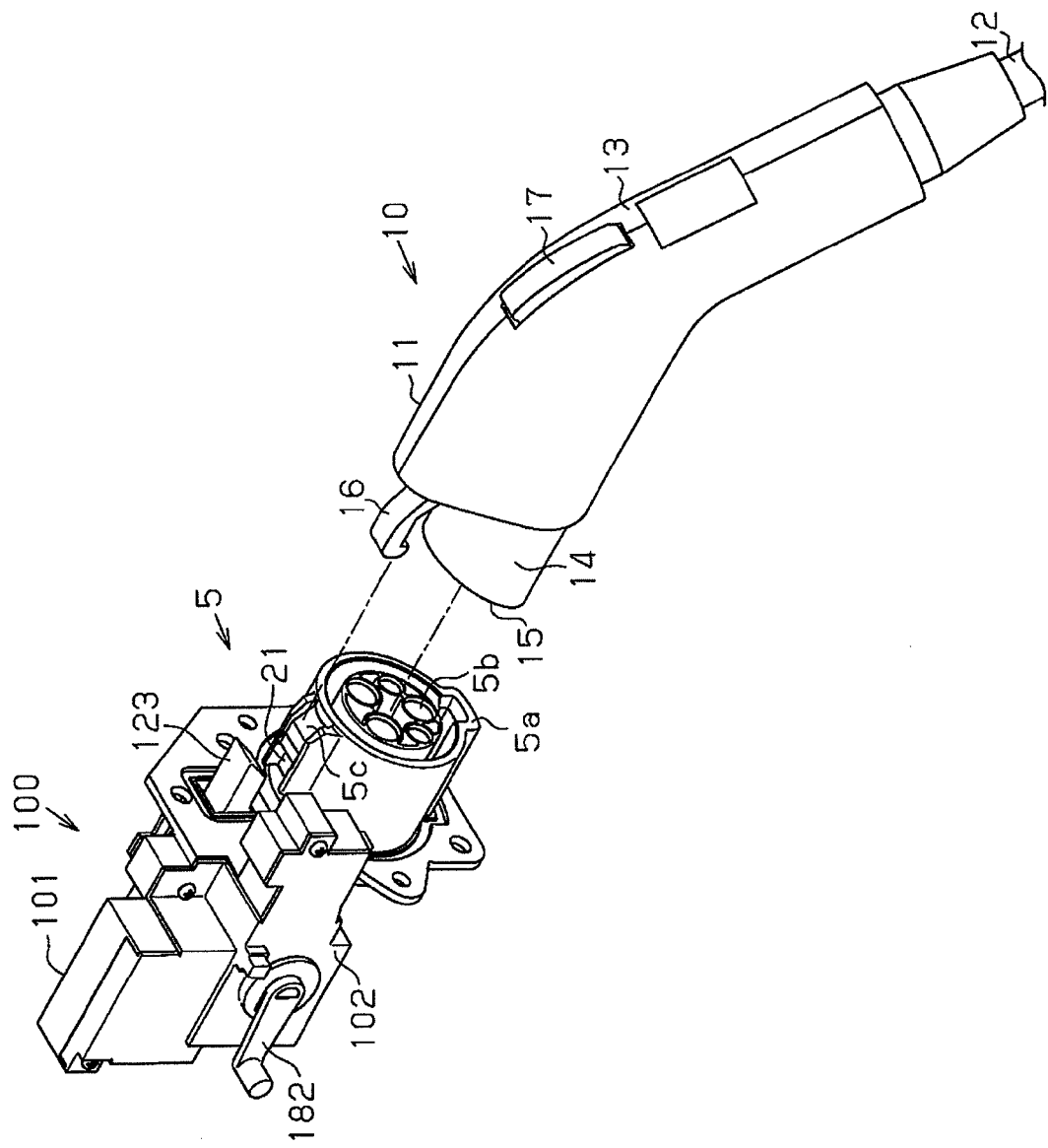
FIG. 5 is a perspective view of the power supplying plug and the inlet.

Referring to FIGS. 5 and 6, the lock device 100 may be accommodated in a case 101, which is a part of the inlet 5 and may be formed integrally with an upper portion of the inlet body 5*a*. A case cover 102 and an end cover 103 are coupled to the case 101. As shown in FIG. 6, the case cover 102 closes a left opening of the case 101. As shown in FIG. 7, the end cover 103 closes a right opening of the case 101.

The actuator 160 of the lock device 100 will now be described. As shown in FIG. 6, the actuator 160 includes a motor 161 (drive source), a worm gear 162, and a helical gear 163. In the illustrated example, the actuator 160 is arranged in an inner case 104, which is fixed to the left open end of the case 101. The inner case 104 includes a left opening. The inner case 104 is one example of a first immovable portion. The helical gear 163 is one example of a rotating body.

The inner case 104 includes an upper portion, which functions as a motor accommodation portion 105 that accommodates the motor 161, and a lower portion, which functions as a helical gear accommodation portion 106 that accommodates the helical gear 163.

In the illustrated example, the motor 161 is fixed to the motor accommodation portion 105 so that a motor shaft of the motor 161 extends downward. The worm gear 162 is fixed to the motor shaft and rotates integrally with the motor shaft. The worm gear 162 is engaged with the helical gear 163. The helical gear 163 includes an axis that preferably extends in the horizontal direction, for example, in the left to right direction as shown in FIG. 7. Rotation of one of the worm gear 162 and the helical gear 163 rotates the other one of the worm gear 162 and the helical gear 163. In the illustrated example, when the motor 161 produces forward rotation, the helical gear 163 is rotated in the clockwise direction as viewed from the left.

As shown in FIG. 7, the helical gear 163 includes a rotor tube 164, which extends in the rightward direction. The rotor tube 164 is coaxial to the helical gear 163. A first rotor projection 165 is formed on an inner surface of the rotor tube 164. The first rotor projection 165 has a shape obtained by forming a sector bounded by two radii that are one half of the inner diameter of the rotor tube 164 and separated by an angle of 45 degrees and then eliminating, from the sector, a further sector bounded by two radii that are one fourth of the inner diameter of the rotor tube 164 and separated by an angle of 45 degrees. The first rotor projection 165 is one example of a first rotation engagement portion.

The helical gear 163 includes an arcuate rotor wall 166 that extends in a circumferential direction of the helical gear 163. The arcuate rotor wall 166 has a larger inner diameter than the outer diameter of the rotor tube 164. The arcuate rotor wall 166 is coaxial to the rotor tube 164. The arcuate rotor wall 166 extends about the axis of the helical gear 163 over a predetermined angle (e.g., 210 degrees). The arcuate rotor wall 166 projects in the same direction as the rotor tube 164.

The rotor tube 164 and the arcuate rotor wall 166 each project from the right surface of the helical gear 163 to a predetermined height. The predetermined height of the rotor tube 164 is greater than the height of the arcuate rotor wall 166 by an amount corresponding to the wall thickness of the inner case 104. A first torsion spring 169 is arranged between the rotor tube 164 and the arcuate rotor wall 166. The first torsion spring 169 includes two ends bent in the radial direction of the helical gear 163. The two ends of the first torsion spring 169 are hooked to the two ends of the arcuate rotor wall 166.

As shown in FIG. 7, the helical gear accommodation portion 106 includes a rotor tube hole 107. The rotor tube hole 107 has a diameter that is slightly larger than the outer diameter of the rotor tube 164. When the helical gear 163 is accommodated in the helical gear accommodation portion 106, the rotor tube 164 is arranged in the rotor tube hole 107.

Figure 8:
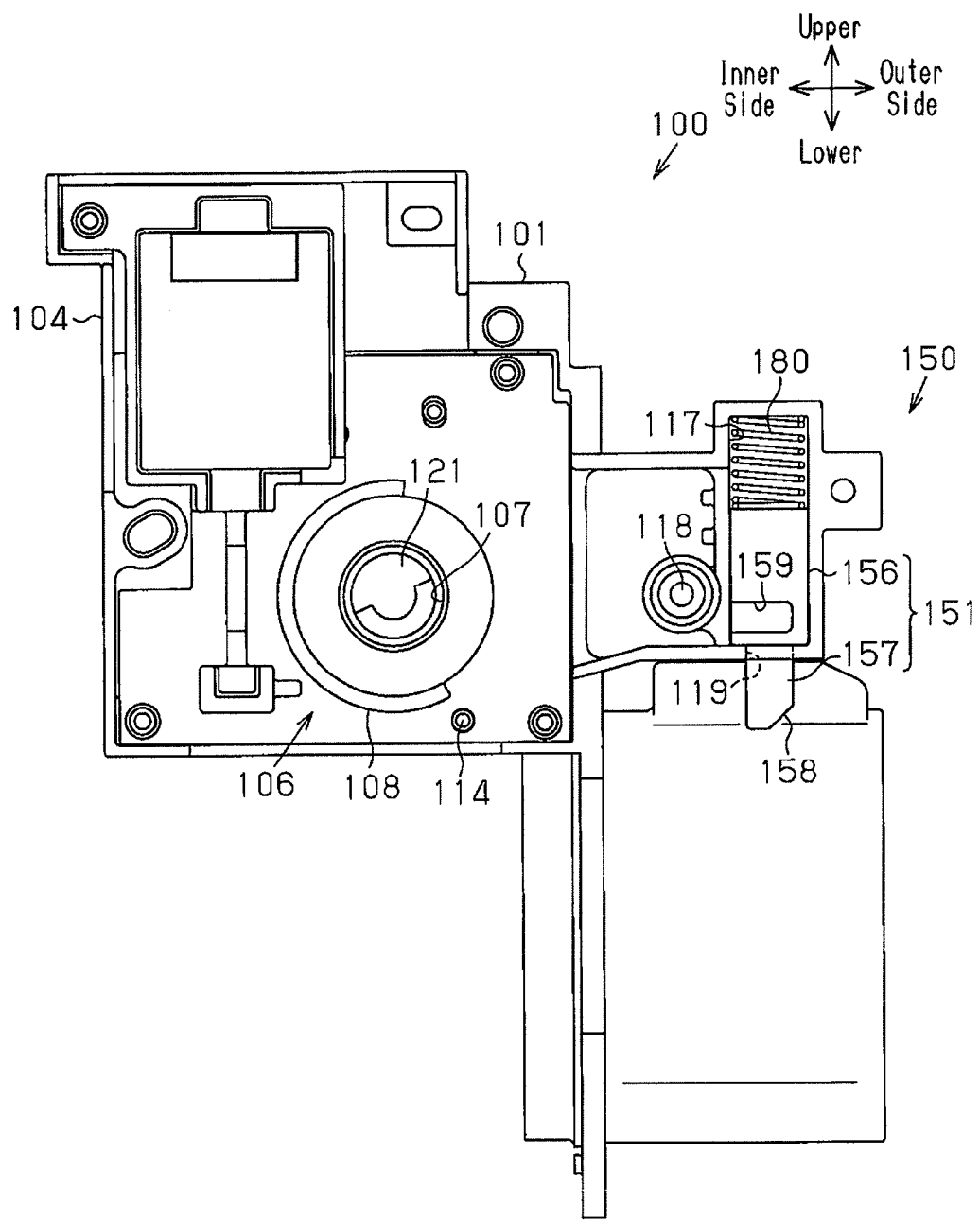
FIG. 8 is a left side view of the lock device.

As shown in FIG. 6, the helical gear accommodation portion 106 includes an arcuate stator wall 108 that extends in the circumferential direction of the helical gear 163. The arcuate stator wall 108 is coaxial with the rotor tube hole 107. The arcuate stator wall 108 has a slightly larger inner diameter than the outer diameter of the arcuate rotor wall 166. As shown in FIG. 8, the arcuate stator wall 108 extends counterclockwise over a range of 210 degrees from the twelve o'clock position to the five o'clock position.

Figure 11A:
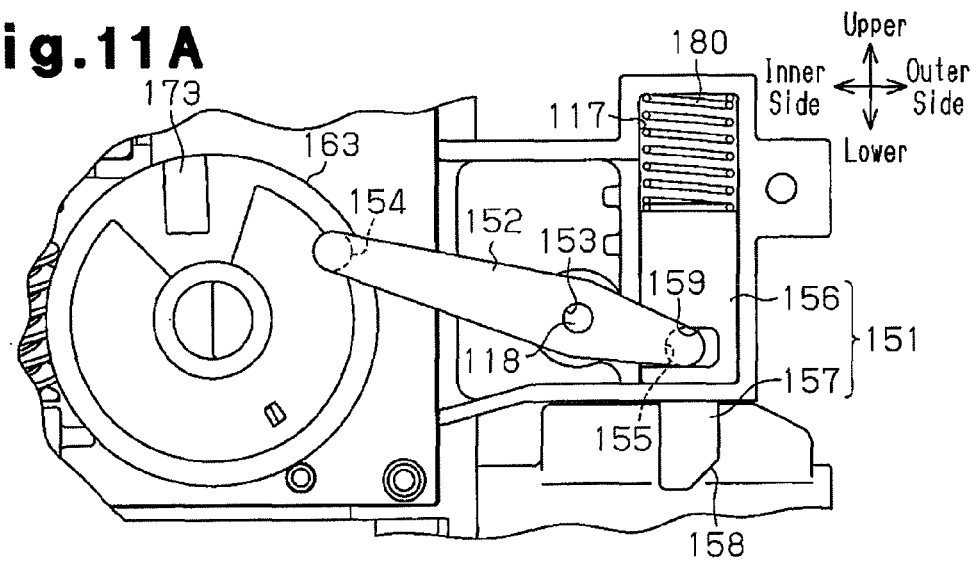
FIG. 11A is a left side view of a lid lock mechanism when the lock device is in a first state.
Figure 11B:
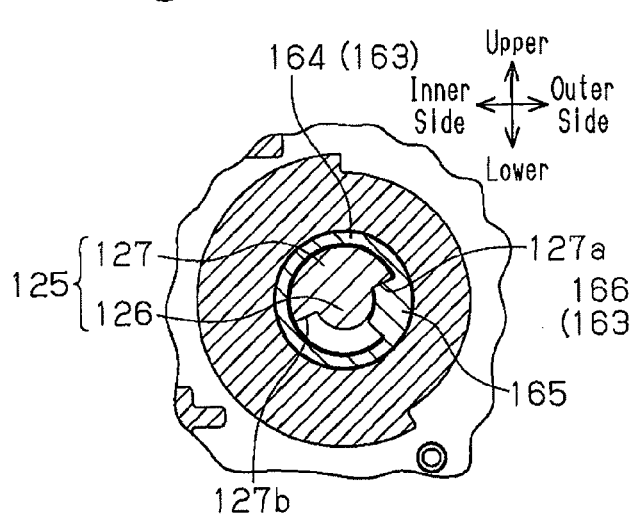
FIG. 11B is a cross-sectional view showing a transmission member and a control shaft engaged with each other when the lock device is in the first state.
Figure 11C:
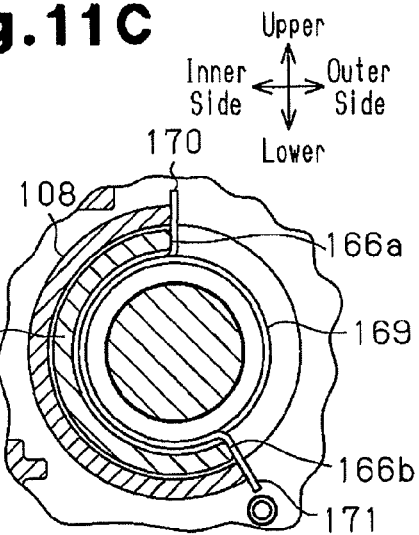
FIG. 11C is a cross-sectional view showing a first torsion spring when the lock device is in the first state.

Referring to FIG. 11C, the rotor tube 164 of the helical gear 163 is fitted to the rotor tube hole 107. Further, the helical gear 163 is accommodated in the helical gear accommodation portion 106 with the arcuate rotor wall 166 entirely extending along the inner surface of the arcuate stator wall 108. The two ends of the first torsion spring 169 are hooked to the two ends of the arcuate stator wall 108 in addition to the two ends of the arcuate rotor wall 166.

In the description hereafter, among the two ends of the arcuate rotor wall 166, as viewed in FIG. 11C, the end located at the twelve o'clock position is referred to as the first movable end 166*a*, and the end located at the five o'clock position is referred to as the second movable end 166*b*. Further, among the two ends of the first torsion spring 169, as viewed in FIG. 11C, the end located at the twelve o'clock position is referred to as the first spring end 170, and the end located at the five o'clock position is referred to as the second spring end 171.

When the helical gear 163 is driven and rotated clockwise against the elastic force of the first torsion spring 169, for example, as shown in FIG. 12C, the first movable end 166*a* is moved to the four o'clock position, and the second movable end 166*a* is moved to the nine o'clock position. This elastically deforms the first torsion spring 169 with the first spring end 170 hooked to the first movable end 166*a*, and the second spring end 171 hooked to the end of the arcuate stator wall 108 located at the five o'clock position. Under this situation, when the drive force applied to the helical gear 163 is eliminated or cancelled, the first torsion spring 169 elastically returns to the state of FIG. 11C. This rotates the helical gear 163 in the direction opposite to the drive direction of the helical gear 163, that is, counterclockwise. The arcuate stator wall 108, the arcuate rotor wall 166, and the first torsion spring 169 form one example of a recovery mechanism. The arcuate rotor wall 166 and the arcuate stator wall 108 are examples of first and second supports. The first and second movable ends 166a and 166b are examples of movable ends. The ends of the arcuate stator wall 108 at the twelve o'clock position and the five o'clock position are examples of immovable ends.

As shown in FIG. 6, the helical gear 163 includes a semicylindrical rotor portion 172 extending in the leftward direction. The semicylindrical rotor portion 172 is coaxial to the helical gear 163.

A second rotor projection 173 projects from the left surface of the helical gear 163. As shown in FIG. 11A, when the helical gear 163 is accommodated in the helical gear accommodation portion 106, the second rotor projection 173 is located at the twelve o'clock position. The second rotor projection 173 is one example of a third rotation engagement portion.

The plug lock mechanism 120 of the lock device 100 will now be described. As shown in FIG. 6, the plug lock mechanism 120 includes a transmission member 121, a control shaft 122 and a hook lock bar 123. The plug lock mechanism 120 is accommodated in the case 101 at the right side of the inner case 104. The control shaft 122 is one example of a plug restriction member. The hook lock bar 123 is one example of a cooperative member. The transmission member 121 is one example of a first transmission member arranged between the rotating body and the plug restriction member.

The case 101 includes a transmission member accommodation portion 109, a control shaft accommodation portion 110, and a hook lock bar accommodation portion 111. The transmission member accommodation portion 109 is formed at the right side of the inner case 104. The control shaft accommodation portion 110 is formed at the right side of the transmission member accommodation portion 109. The hook lock bar accommodation portion 111 is formed at the outer side of the control shaft accommodation portion 110. The control shaft accommodation portion 110 is in communication with the transmission member accommodation portion 109. The hook lock bar accommodation portion 111 is in communication with the control shaft accommodation portion 110.

The transmission member 121 includes a disk-shaped main body 124, the axis of which extends in the left to right direction. The main body 124 includes a rotation shaft 125 extending in the leftward direction. The main body 124 has a shape obtained by joining planar surfaces of a first semicylinder 126, which has a radius that is slightly smaller than one fourth the inner diameter of the rotor tube 164, and a second semicylinder 127, which has a radius that is slightly smaller than one half the inner diameter of the rotor tube 164. The rotation shaft 125 is fitted into the rotor tube 164. This arranges the second semicylinder 127 in the rotation path of the rotor projection 165. The rotation shaft 125 is one example of a second rotation engagement portion.

In the description hereafter, among the two edge surfaces of the second semicylinder 127, as viewed in FIG. 11B, when the first semicylinder 126 is located at the lower side and the second semicylinder 127 is located at the upper side, the relative outer edge is referred to as the first rotation shaft edge 127a. The relative inner edge is referred to as the second rotation shaft edge 127b.

As shown in FIG. 7, the right central portion of the main body 124 includes a semicircular recess 128. Further, the right surface of the main body 124 includes a semicircular pushing portion 129, which extends in the radial direction. The main body 124 also includes a semicircular plate portion 130, which extends in the radial direction. The semicircular plate portion 130 and the semicircular pushing portion 129 are arranged on opposite sides of the recess 128. As shown in FIG. 6, a pin 131 projects from the left surface of the semicircular plate portion 130.

Figure 15A:
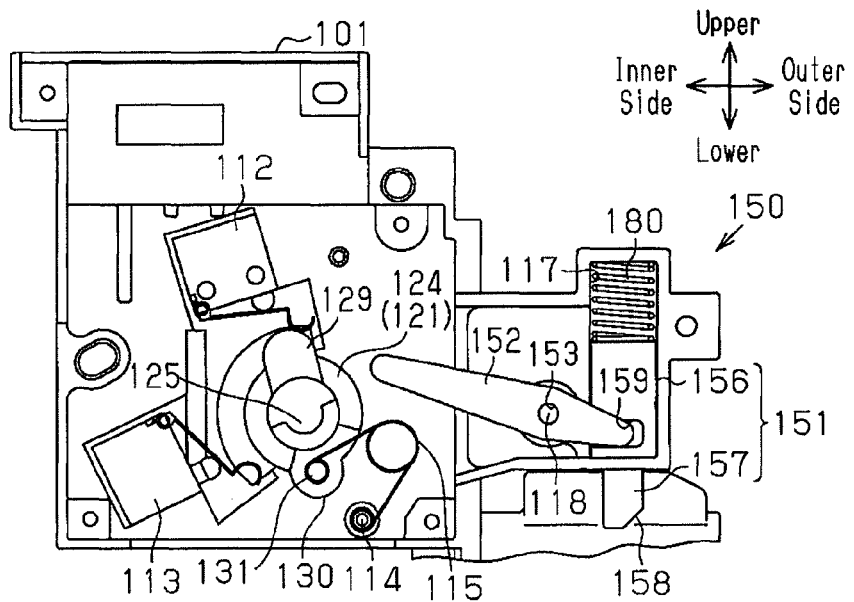
FIG. 15A is a side view showing the transmission member and a second torsion spring when a helical gear is located a reference position.

As shown in FIG. 15A, first and second microswitches 112 and 113 are fixed to the inner surface of the case 101 by the semicircular pushing portion 129. The semicircular pushing portion 129 pushes the first microswitch 112 when located at the twelve o'clock position. The semicircular pushing portion 129 pushes the second microswitch 113 when located at the seven o'clock position. The first and second microswitches 112 and 113 are electrically connected to the charge ECU 75. When pushed by the semicircular pushing portion, the first and second microswitches send electric signals to the charge ECU 75 indicating the pushing. The charge ECU 75 recognizes the rotation state of the transmission member 121 based on the electric signals from the first and second microswitches 112 and 113.

Figure 15B:
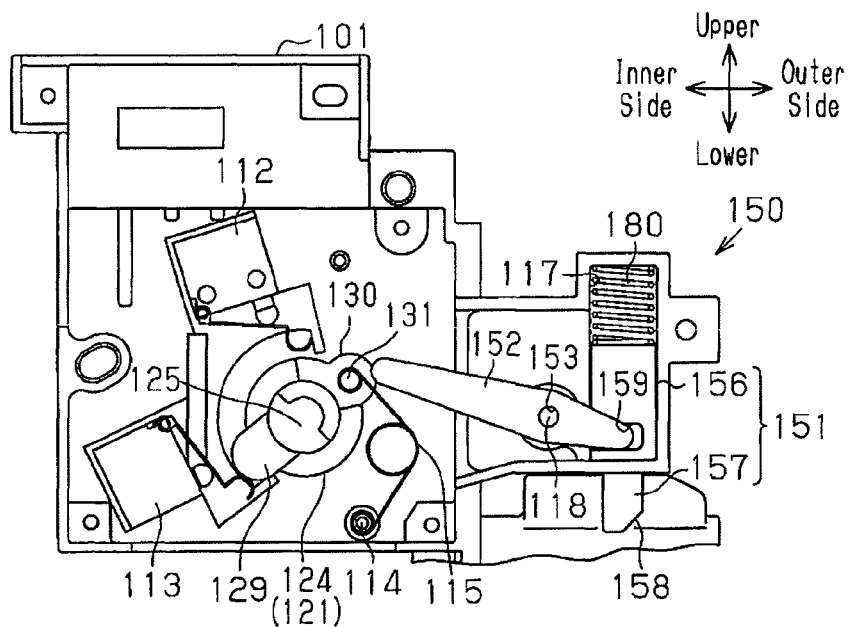
FIG. 15B is a side view showing the transmission member and the second torsion spring when the helical gear is rotated in a counterclockwise direction.

As shown in FIG. 6, a pin 114 (second immovable portion) projects toward the left side from the inner surface of the case 101. The pins 114 and 131 support a second torsion spring 115. As shown in FIG. 15B, the second torsion spring 115 is supported so that a coil portion is located at an outer side of the transmission member 121. As viewed in FIG. 15B, when the semicircular pushing portion 129 is pushing the second microswitch 113 at the seven o'clock position, that is, when the semicircular plate portion 130 (pin 131 of transmission member 121) is located at the one o'clock position, the second torsion spring 115 is in an equilibrium state and does not urge the pins 114 and 131. Under this situation, when the transmission member 121 rotates clockwise or counterclockwise, the second torsion spring 115 is elastically deformed and acts to elastically return to the previous equilibrium state. This rotates the transmission member 121 to arrange the semicircular pushing portion 129 at the seven o'clock position.

As viewed in FIG. 15A, when the semicircular pushing portion 129 pushes the first microswitch 112 at the twelve o'clock position, that is, when the semicircular plate portion 130 (pin 131 of transmission member 121) is located at the six o'clock position, the second torsion spring 115 is elastically deformed and thus acts to return to the equilibrium state. However, the direction of the force that the second torsion spring 115 applied to the pin 131 of the transmission member 121 extends through the rotation shaft 125 of the transmission member 121. Thus, the force applied to the pin 131 of the transmission member 121 does not produce a rotational moment. Accordingly, the semicircular pushing portion 129 remains at the twelve o'clock position and continues to push the first microswitch 112.

Figure 9A:
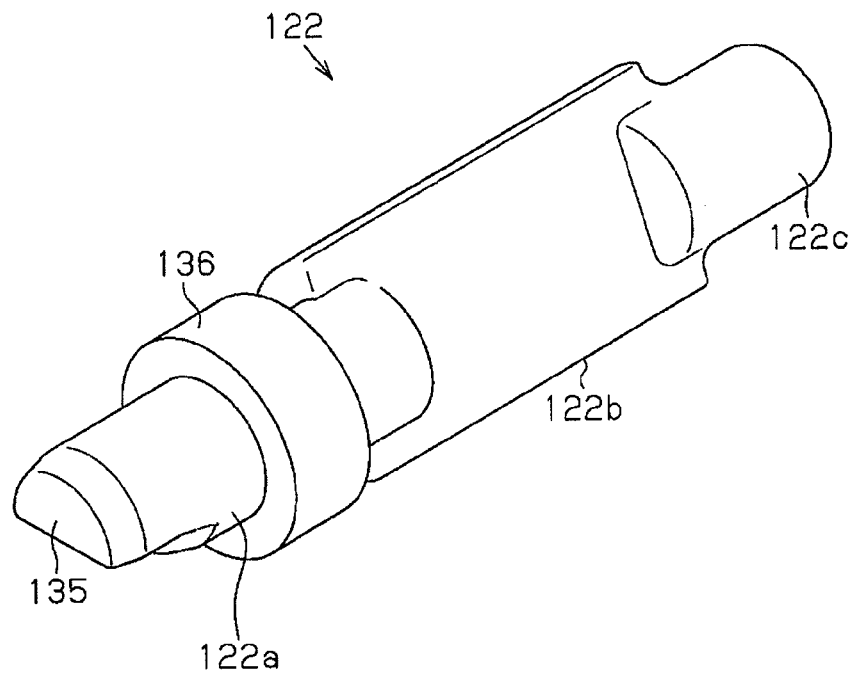
FIGS. 9A and 9B are perspective views of a control shaft.

As shown in FIG. 6, the control shaft accommodation portion 110 may be tubular. As shown in FIG. 9A, the control shaft 122 includes a first shaft portion 122a, a hook lock bar restriction portion 122b, and a second shaft portion 122c.

Figure 9B:
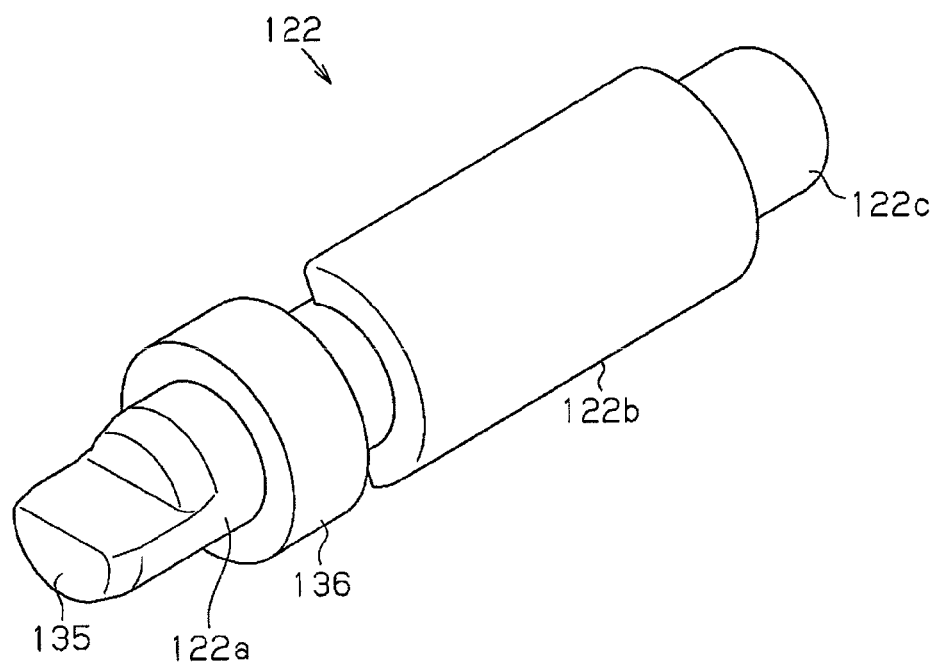

As shown in FIG. 9B, the first shaft portion 122a is cylindrical. A semi-cylindrical end, or coupling portion 135, is formed at the left side of the first shaft portion 122a. The coupling portion 135 has a diameter that is set to be smaller than the diameter of the recess 128. The coupling portion 135 is fitted into the recess 128, and the control shaft 122 is rotated integrally with the transmission member 121. In the illustrated example, a ring-shaped lip seal 136 is arranged on the first shaft portion 122a. When the coupling portion 135 is fitted to the recess 128, the lip seal 136 comes into contact with the helical gear accommodation portion side of the inner wall of the transmission member accommodation portion 109, and hermetically seals the control shaft accommodation portion 110.

Figure 11D:
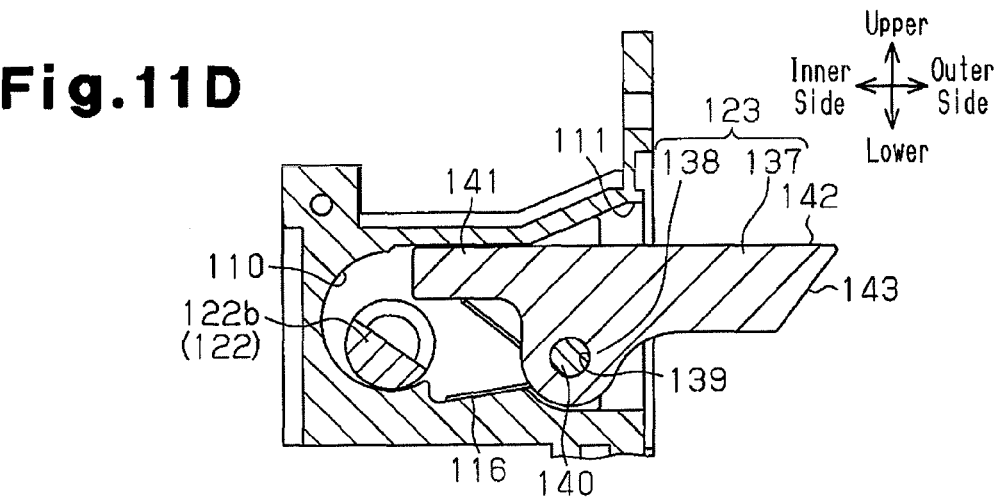
FIG. 11D is a cross-sectional view showing a hook lock bar restriction portion and a hook lock bar engaged with each other when the lock device is in the first state.

As shown in FIGS. 9A and 9B, the hook lock bar restriction portion 122b is semi-cylindrical and arranged at the right side of the first shaft portion 122a. The hook lock bar restriction portion 122b is coaxial with the first shaft portion 122a. Referring to FIG. 11D, the diameter of the hook lock bar restriction portion 122b is smaller than the inner diameter of the control shaft accommodation portion 110. As shown in FIG. 13D, when the hook lock bar restriction portion 122b occupies the region extending clockwise from the twelve o'clock position to the six o'clock position, the hook lock bar restriction portion 122b is located at a hook lock bar unlock position. The hook lock bar restriction portion 122b moves, or rotates, between the hook lock bar lock position and a hook lock bar unlock position.

As shown in FIG. 9A, the second shaft portion 122c is cylindrical and arranged at the right side of the hook lock bar restriction portion 122b. The second shaft portion 122c is coaxial with the first shaft portion 122a.

As shown in FIG. 7, the hook lock bar accommodation portion 111 is in communication with the control shaft accommodation portion 110 through an opening that extends through a relatively outer side of the right wall of the control shaft accommodation portion 110. The hook lock bar accommodation portion 111 has an opening facing the upper side of the hook seat 21.

As shown in FIG. 10, the hook lock bar accommodation portion 111 accommodates the hook lock bar 123, which is T-shaped as viewed from above. The hook lock bar 123 includes a horizontal member 137, which extends from the inner side toward the outer side, and a vertical member 138, which extends downward from a central portion of the horizontal member 137. A through hole 139 extends through the distal end of the vertical member 138 in the left to right direction. A rotation shaft 140 is inserted through the through hole 139. The rotation shaft 140 is rotatably supported by the case 101 and the end cover 103, which closes the right opening of the case 101. The hook lock bar 123 is rotatably supported by the rotation shaft 140.

The inner end of the horizontal member 137 defines a thin portion 141 having a thickness that gradually decreases in the vertical direction toward the inner side, that is, toward the control shaft 122. The thin portion 141 is located between the hook lock bar restriction portion 122b of the control shaft 122 and the upper wall of the control shaft accommodation portion 110. The hook lock bar 123 is movable between a horizontal position and a tilted position. The solid lines in FIG. 10 show the hook lock bar 123 located at the horizontal position in which the upper surface of the thin portion 141 is in contact with the upper wall of the control shaft accommodation portion 110. The broken lines in FIG. 10 show the hook lock bar 123 located at the tilted position in which the lower surface of the thin portion 141 is in contact with the lower wall of the control shaft accommodation portion 110. In the illustrated example, the rotation path of the hook lock bar restriction portion 122b lies along the rotation path of the thin portion 141 about the rotation shaft 140. FIG. 13D shows the hook lock bar restriction portion 122b located at a hook lock bar lock position in which the hook lock bar restriction portion 122b is arranged in the rotation path of the thin portion 141. When the hook lock bar restriction portion 122b is located at this position, the hook lock bar 123 comes into contact with the hook lock bar restriction portion 122b. Thus, the hook lock bar 123 cannot be moved from the horizontal position to the tilted position.

In the illustrated example, a third torsion spring 116 is arranged on the rotation shaft 140. The two ends of the third torsion spring 116 are respectively engaged with the lower surface of the thin portion 141 and the lower wall of the control shaft accommodation portion 110. The elastic force of the third torsion spring 116 constantly urges the thin portion 141 upward. Thus, the hook lock bar 123 is maintained at the horizontal position in a normal state.

Referring to FIG. 10, the outer end of the horizontal member 137 defines a hook lock 142 that projects above the hook seat 21. The distal end of the hook lock 142 includes a hook guide surface 143 gradually inclined upward toward the outer side. Thus, when the hook lock bar restriction portion 122b is located at the hook lock bar unlock position and, for example, the hook guide surface 143 is pushed by the hook 16 from the outer side to the inner side, the hook lock bar 123 is pivoted toward the right, as viewed in FIG. 10, about the rotation shaft 140 and moved to the tilted position.

The lid lock mechanism 150 of the lock device 100 will now be described. As shown in FIG. 6, the lid lock mechanism 150 includes a lid lock bar 151, which restricts opening of the lid 40, and a link bar 152, which transmits the rotation of the helical gear 163 to the lid lock bar 151. The lid lock bar 151 is one example of a lid restriction member. The link bar 152 is one example of a second transmission member arranged between the drive mechanism and the lid restriction member.

As shown in FIG. 6, the outer side of the helical gear accommodation portion 106 in the case 101 defines a lid lock bar accommodation portion 117, which accommodates the lid lock bar 151. In the illustrated example, the lid lock bar accommodation portion 117 is located above the left side of the inlet 5 as viewed from the outer side. A pivot shaft 118 is formed on an inner wall of the lid lock bar accommodation portion 117. The pivot shaft 118 may be a cylindrical pin extending in the leftward direction.

As shown in FIG. 6, a first engagement pin 154 is formed on the inner end of the link bar 152. The first engagement pin 154 is at least partially arranged in the rotation path of the second rotor projection 173. A second engagement pin 155, which extends in the rightward direction, is formed on the outer end of the link bar 152. Thus, referring to FIG. 12A, when the helical gear 163 rotates clockwise and the second rotor projection 173 lowers the first engagement pin 154, the second engagement pin 155 is lifted. The first engagement pin 154 is one example of a fourth rotation engagement portion.

As shown in FIG. 6, the lower wall of the lid lock bar accommodation portion 117 includes a cylindrical bar insertion hole 119. When the lid 40 is in a closed state, the bar insertion hole 119 is opposed to the latch hole 42.

The lid lock bar 151 includes a box-shaped base portion 156 and a bar portion 157, which is continuous with the lower side of the base portion 156. The length of a diagonal line of the bottom surface of the base portion 156 is set to be greater than the diameter of the bar insertion hole 119. Further, the bar portion 157 has a smaller diameter than the bar insertion hole 119. As shown in FIG. 8, the lid lock bar 151 is accommodated in the lid lock bar accommodation portion 117 with the base portion 156 of the lid lock bar 151 engaged with the lower wall of the lid lock bar accommodation portion 117, and the bar portion 157 projected from the bar insertion hole 119. The distal end of the bar portion 157 defines a bar guide surface 158 gradually inclined downward toward the lower side. The bar guide surface 158 is located in the pivotal path of the U-shaped plate 41 (latch hole 42), which moves when the lid 40 opens and closes the inlet accommodation portion 1*a*. Thus, referring to FIG. 12A, when the U-shaped plate 41 pushes the bar guide surface 158 from the outer side toward the inner side, the lid lock bar 151 is moved to a lid unlock position in which an upper section of the bar portion 157 is accommodated in the lid lock bar accommodation portion 117. This permits further inward movement of the lid 40.

As shown in FIG. 8, a bar recess 159 that is slightly larger than the second engagement pin 155 is formed at the right side of the base portion 156. Referring to FIG. 12A, the second engagement pin 155 is fitted into the bar recess 159. Thus, when the first engagement pin 154 lowers the second rotor projection 173 and lifts the second engagement pin 155, the lid lock bar 151 is lifted and moved to the lid unlock position.

A coil spring 180 is arranged between the upper surface of the base portion 156 and the upper wall of the lid lock bar accommodation portion 117. The coil spring 180 constantly urges the lid lock bar 151 downward. Accordingly, when the elastic force of the coil spring 180 lowers the lid lock bar 151 from the lid unlock position to a lid lock position, the second engagement pin 155 is lowered. When the second engagement pin 155 is lowered, the first engagement pin 154 is lifted. In this case, when the first engagement pin 154 is in contact with the lower surface of the second rotor projection 173, the helical gear 163 rotates counterclockwise.

As shown in FIG. 6, the case cover 102, which closes the left opening of the case 101, includes a case cover insertion hole 181, which has a slightly larger diameter than the semi-cylindrical rotor portion 172 of the helical gear 163. When the case cover 102 is coupled to the case 101, the semicylindrical rotor portion 172 projects out of the case cover 102. A manual operation lever 182 is fixed to the projecting semicylindrical rotor portion 172. The helical gear 163 may be rotated by operating the manual operation lever 182. Preferably, the manual operation lever 182 is arranged in a hidden location where it would be unnoticed by a person, such as in the trunk.

The operation of the lock device 100 when charging the battery 4 with the power supplying plug 10 will now be described. The description hereafter will be given under the assumption that the travel drive source of the vehicle 1 is stopped. Here, as shown in FIG. 11A, the second rotor projection 173 is located at the twelve o'clock position, and the lid lock bar 151 is located at the lid lock position. As shown in FIG. 11B, the first rotor projection 165 is located at the three o'clock position. As shown in FIG. 11C, the first movable end 166*a* is located at the twelve o'clock position, and the second movable end 166*b* is located at the five o'clock position. As shown in FIG. 11B, the first rotation shaft edge 127*a* is located at the two o'clock position, and the second rotation shaft edge 127*b* is located at the eight o'clock position. As shown in FIG. 11D, the hook lock bar restriction portion 122*b* is located at the hook lock bar unlock position. The hook lock bar 123 is movable to the tilted position. Under this situation, the lock device 100 is in a first state. In the first state, the first rotor projection 165 is in contact with the first rotation shaft edge 127*a*. Here, the lid 40 is in a closed state. Accordingly, the lid 40 is protecting the inlet 5 from the ambient environment, and the power supplying plug 10 cannot be connected to the inlet 5. In this case, as shown in FIG. 15A, the semicircular pushing portion 129 is located at the twelve o'clock position and pushes the first microswitch 112.

When the user pushes the lid open switch 77, the charge ECU 75 receives a signal indicating that the lid open switch 77 has been operated. Then, the charge ECU 75 checks the exterior verification result of the verification ECU 71. After determining that the exterior verification has been accomplished, the charge ECU 75 activates the timer 75*a* and outputs a drive signal to drive the motor 161 and produce forward rotation during the period the timer 75*a* is activated. This starts an unlock operation of the lid 40.

When the motor 161 produces forward rotation, the helical gear 163 rotates in the clockwise direction and the lock device 100 shifts to a second state, which is shown in FIGS. 12A to 12D. Referring to FIG. 12A, clockwise movement of the second rotor projection 173 lowers the first engagement pin 154. That is, the second engagement pin 155 lowers the lid lock bar 151 against the urging force of the coil spring 180. Accordingly, the lid lock bar 151 is arranged at the lid unlock position. This removes the lid lock bar 151 from the latch hole 42. The lid 40 is urged by a biasing means (not shown) in an opening direction. Thus, the removal of the lid lock bar 151 from the latch hole 42 moves the lid 40 in the opening direction. Accordingly, the lid 40 opens the inlet 5.

Further, as shown in FIG. 12C, the first movable end 166*a* moves to the four o'clock position, and the second movable end 166*b* moves to the nine o'clock position. Thus, the first torsion spring 169 is elastically deformed with the first spring end 170 hooked to the first movable end 166*a* and the second spring end 171 hooked to the end of the arcuate stator wall 108 located at the five o'clock position.

As shown in FIG. 12B, the first rotor projection 165 moves clockwise and stops at the seven o'clock position. Accordingly, the first rotor projection 165 does not push the second rotation shaft edge 127*b*. Thus, the rotation shaft 125, or the transmission member 121, does not rotate. Accordingly, the control shaft 122 also does not rotate. Thus, as shown in FIG. 12D, the hook lock bar restriction portion 122*b* remains at the hook lock bar unlock position. Further, the semicircular pushing portion 129 continues to push the first microswitch 112.

Referring to FIG. 12A, when the lid lock bar 151 moves to the lid unlock position, that is, when the helical gear 163 rotates until the second rotor projection 173 lowers the first engagement pin 154, the timer 75*a* is deactivated. Accordingly, the charge ECU 75 stops the output of the drive signal to the motor 161. This stops the application of torque in the clockwise direction from the motor 161 to the helical gear 163. Here, referring to FIG. 12C, the elastic recovery force of the first torsion spring 169 applies torque in the counterclockwise direction to the helical gear 163. Accordingly, the helical gear 163 rotates counterclockwise, and the lock device 100 returns to the first state, which is shown in FIGS. 11A to 11D. Here, the lid 40 is open. Further, the hook lock bar restriction portion 122*b* is held at the hook lock bar unlock position. This allows for movement of the hook lock bar 123 to the tilted position, and connection of the power supplying plug 10 to the inlet 5.

Figure 16:
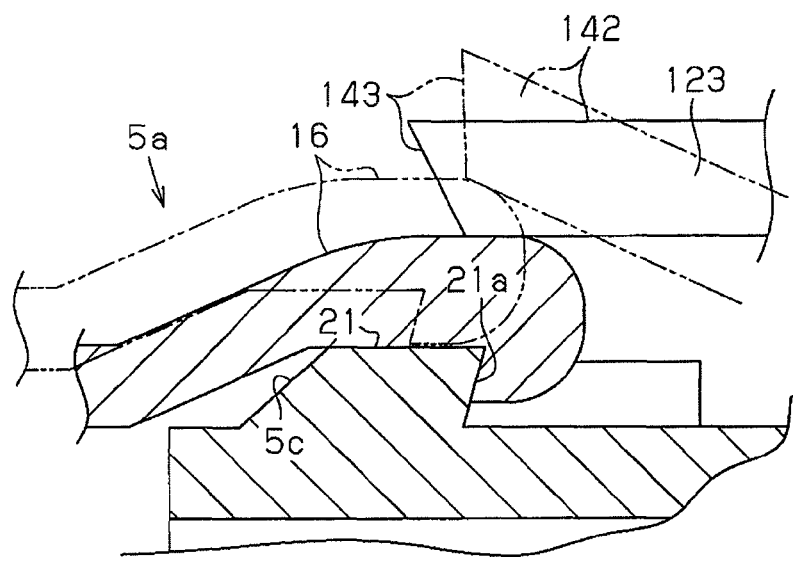
FIG. 16 is a cross-sectional view of the inlet and the power supplying plug in an engaged state and a disengaged state.

Referring to FIG. 5, the power supplying end 14 is aligned with the power reception end 5*b*, and the hook 16 is engaged with the recess 21*a* of the hook seat 21. Then, the power supplying plug 10 is moved toward the inlet 5. Referring to FIG. 16, this guides the hook 16 along the slope 5*c* and moves the hook upward against the elastic force acting to hold the hook at the first position. Further movement of the power supplying plug 10 toward the inlet 5 moves the hook 16 over the slope 5*c* as shown by the broken lines in FIG. 15 until reaching the recess 21*a*. The distal portion of the hook 16 pushes the hook guide surface of the hook lock bar 123 and moves the hook lock bar 123 to the tilted position. By further moving the power supplying plug toward the inlet 5, the elastic force acting to hold the hook 16 at the first position moves the hook 16 downward. This engages the hook 16 with the inner surface 21*b* of the recess 21*a*, as shown by the solid lines in FIG. 16. Consequently, the connection terminals 15 of the power supplying plug 10 are connected in a preferable manner with the connection terminals 29 of the inlet 5. This electrically connects the power supplying plug 10 and the inlet 5.

When the power supplying plug 10 is connected to the inlet 5, the charge ECU 75 receives a connection signal from the charge device 62. The charge ECU 75 recognizes the connection of the power supplying plug 10 and the inlet 5 when receiving the connection signal. Then, the charge ECU 75 starts charging the battery 4 with power from the external power supply 61, and outputs a drive signal that drives and produces reverse rotation with the motor 161 to move the hook lock bar restriction portion 122b to the hook lock bar lock position. This starts the lock operation of the power supplying plug 10.

Figure 13A:
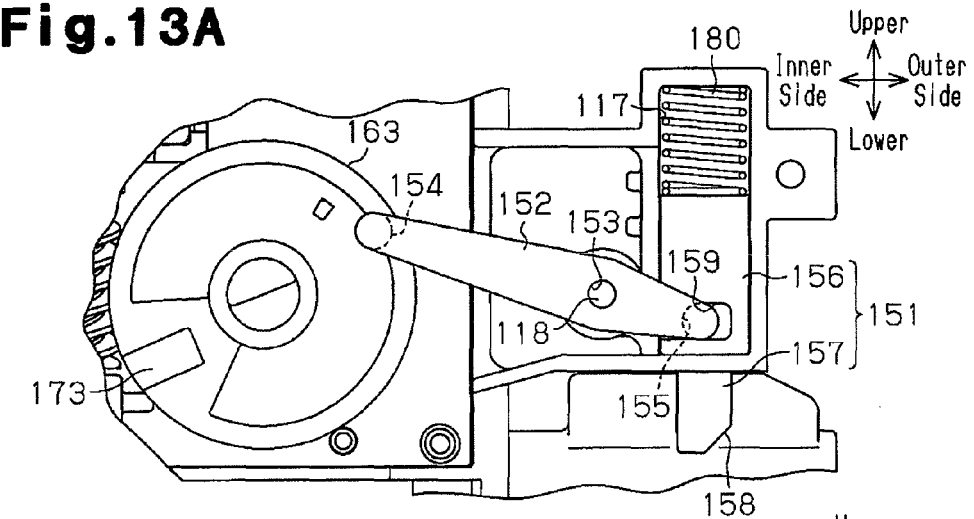
FIG. 13A is a left side view of the lid lock mechanism when the lock device is in a third state.
Figure 13B:
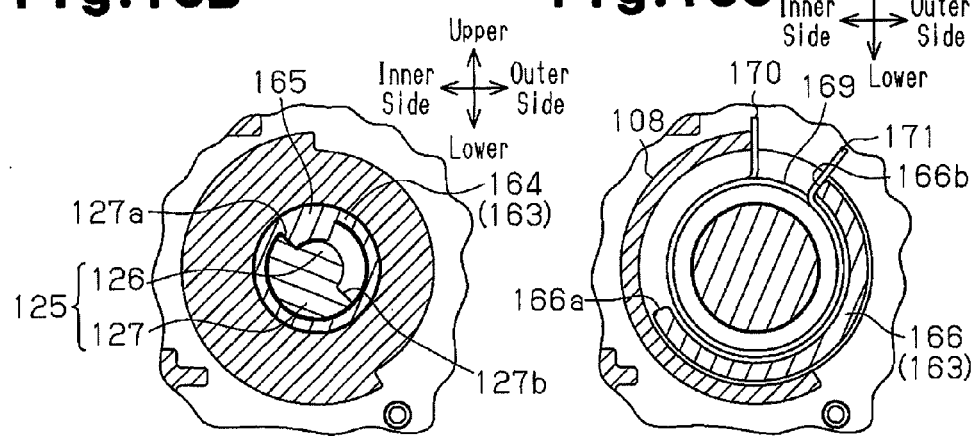
FIG. 13B is a cross-sectional view showing the transmission member and the control shaft engaged with each other when the lock device is in the third state.
Figure 13C:
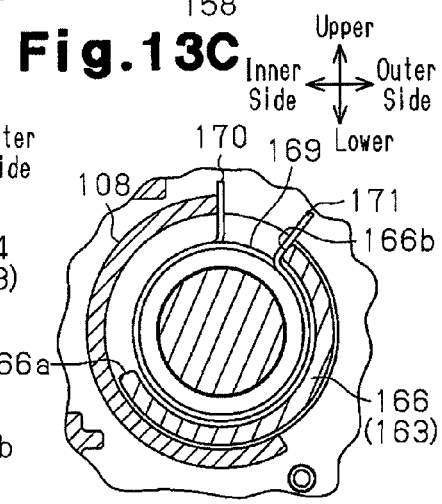
FIG. 13C is a cross-sectional view showing the locations of the two ends of the first torsion spring when the lock device is in the third state.
Figure 13D:
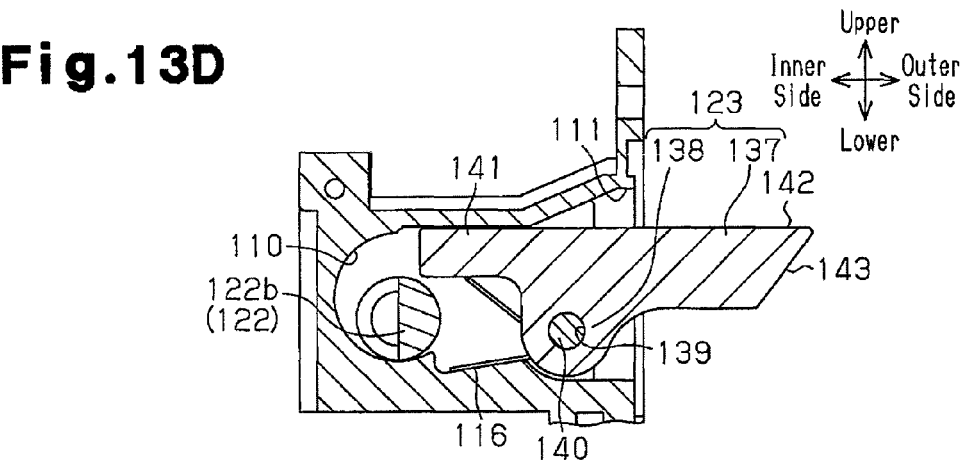
FIG. 13D is a cross-sectional view showing the hook lock bar restriction portion and the hook lock bar engaged with each other when the lock device is in the third state.

When the motor 161 starts producing reverse rotation, the helical gear 163 rotates counterclockwise and shifts the lock device 100 to a third state shown in FIGS. 13A to 13D. Referring to FIG. 13B, the first rotor projection 165 moves counterclockwise and pushes the first rotation shaft edge 127a in the counterclockwise direction. That is, the transmission member 121 and the control shaft 122 rotate counterclockwise. Consequently, as shown in FIG. 15B, the semicircular pushing portion 129 pushes the second microswitch 113. When pushed by the semicircular pushing portion 129, the second microswitch 113 sends an electric signal to the charge ECU 75 indicating the pushing. When receiving the electric signal from the second microswitch 113, the charge ECU 75 stops the output of the drive signal to the motor 161. This stops rotating the helical gear 163 in the counterclockwise direction. Here, the second torsion spring 115 is in an equilibrium state.

As shown in FIG. 13D, the rotation of the control shaft 122 moves the hook lock bar restriction portion 122b to the hook lock bar lock position. This restricts movement of the hook lock bar 123 to the tilted position. As long as movement of the hook lock bar 123 to the tilted position is restricted, the hook 16 cannot be disengaged from the recess 21a. Thus, the removal of the power supplying plug 10 from the inlet 5 is restricted. As shown in FIG. 13C, the first movable end 166a moves to the eight o'clock position, and the second movable end 166b moves to the one o'clock position. That is, the first torsion spring 169 is elastically deformed with the first spring end 170 hooked to the end of the arcuate stator wall 108 at the twelve o'clock position, and the second spring end 171 hooked to the second movable end 166b.

Referring to FIG. 13A, the second rotor projection 173 moves counterclockwise and stops at the eight o'clock position. That is, the second rotor projection 173 does not engage with the first engagement pin 154. Accordingly, the lid lock bar 151 remains at the lid lock position.

Figure 14A:
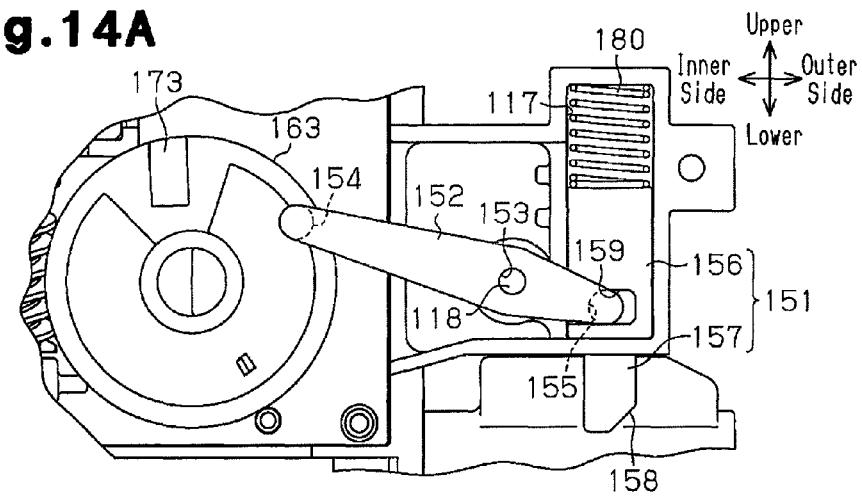
FIG. 14A is a left side view of the lid lock mechanism when the lock device is in a fourth state.
Figure 14B:
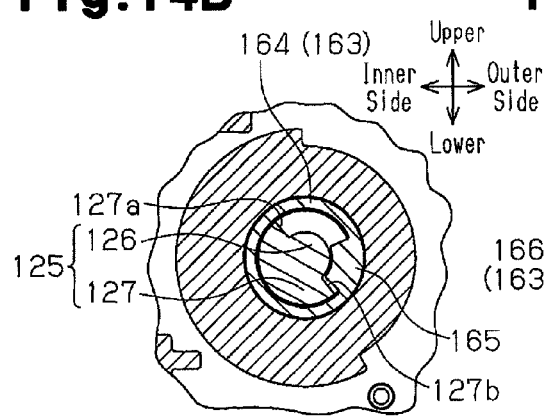
FIG. 14B is a cross-sectional view showing the transmission member and the control shaft engaged with each other when the lock device is in the fourth state.
Figure 14C:
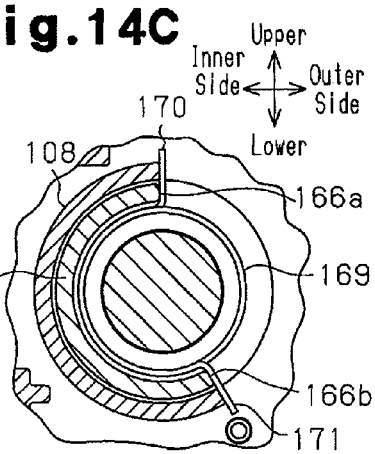
FIG. 14C is a cross-sectional view showing the locations of the two ends of the first torsion spring when the lock device is in the fourth state.
Figure 14D:
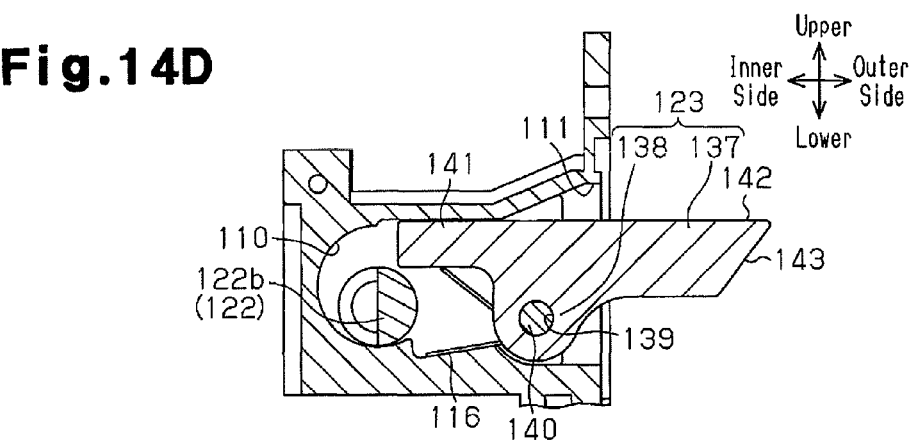
FIG. 14D is a cross-sectional view showing the hook lock bar restriction portion and the hook lock bar engaged with each other when the lock device is in the fourth state.

When the charge ECU 75 stops outputting the drive signal to the motor 161, the motor 161 stops applying torque in the counterclockwise direction to the helical gear 163. Referring to FIG. 13C, the elastic recovery force of the first torsion spring 169 applies clockwise torque to the helical gear 163. Accordingly, the helical gear 163 rotates clockwise. This shifts the lock device 100 to a fourth state shown in FIGS. 14A to 14D. Referring to FIG. 14B, when the helical gear 163 rotates clockwise, the first rotor projection 165 does not contact the second movable end 166b. Thus, the transmission member 121 and the control shaft 122 do not rotate. Accordingly, as shown in FIG. 14D, the hook lock bar restriction portion 122b remains in the hook lock bar lock state. Thus, removal of the power supplying plug 10 from the inlet 5 is continuously restricted. Resistance between the first rotor projection 165 and the rotation shaft 125 may produce a rotational moment that acts on the transmission member during the clockwise rotation of the helical gear 163. However, the second torsion spring 115, which is in the equilibrium state, holds the transmission member 121 at the same position.

The operation of the lock device 100 when removing the power supplying plug 10 from the inlet 5 will now be described.

When the plug removal switch 76 is operated and the charge ECU 75 receives a signal indicating that the plug removal switch 76 has been operated, the charge ECU 75 checks the external verification result of the verification ECU 71. After determining that the external verification has been accomplished, the motor 161 outputs a drive signal that drives the motor 161 in the forward direction. This starts the unlock operation of the lid 40. The charge ECU 75 does not activate the timer 75a even though the plug removal switch 76 has been operated.

When the motor 161 is driven to produce forward rotation, the helical gear 163 is rotated clockwise, and the lock device 100 is shifted to the second state shown in FIGS. 12A to 12D. The first rotor projection 165 moves clockwise and pushes the second rotation shaft edge 127b clockwise. Referring to FIG. 12D, the transmission member 121 and the control shaft 122 rotate clockwise. Referring to FIG. 15A, the transmission member 121 rotates clockwise, and the semicircular pushing portion 129 pushes the first microswitch 112. As a result, the first microswitch 112 sends a signal indicating that the first microswitch 112 has been pushed to the charge ECU 75. When the electric signal is received from the first microswitch 112, the charge ECU 75 stops the output of the drive signal to the motor 161. This stops the clockwise rotation of the helical gear 163.

Referring to FIG. 12D, the control shaft 122 rotates counterclockwise, and the hook lock bar restriction portion 122b moves to the hook lock bar unlock position. Thus, removal of the power supplying plug 10 from the inlet 5 is permitted. Further, referring to FIG. 12C, the first movable end 166a moves to the four o'clock position, and the second movable end 166b moves to the nine o'clock position. Thus, the first torsion spring 169 is elastically deformed with the first spring end 170 hooked to the first movable end 166a and the second spring end 171 hooked to the end of the arcuate stator wall 108 at the five o'clock position.

When the charge ECU 75 stops outputting the drive signal that drives the motor 161 to produce forward rotation, the elastic recovery of the first torsion spring 169 returns the lock device 100 to the first state shown in FIGS. 11A to 11D. Here, as shown in FIG. 11D, the lock device 100 remains at the hook lock bar unlock position. This allows the hook lock bar 123 to move to the tilted position. Thus, the hook 16 may be disengaged from the recess 21a, and the power supplying plug 10 may be removed from the inlet 5.

The lid lock bar 151 is located at the lid lock position. After the power supplying plug 10 is removed from the inlet 5, when the user closes the inlet accommodation portion 1a with the lid 40, the U-shaped plate 41 of the lid 40 pushes the bar guide surface 158 of the lid lock bar 151. This moves the lid lock bar 151 to the lid unlock position. When the opening 1b is closed by the lid 40, that is, when the latch hole 42 and the bar insertion hole 119 are opposed to each other, the urging force of the coil spring 180 moves the lid lock bar 151 to the lid lock position. Accordingly, the lid lock bar 151 is inserted into the latch hole 42. This restricts opening of the lid 40.

The lock device 100 includes the manual operation lever 182 that rotates integrally with the helical gear 163. The manual operation lever 182 allows the lock device 100 to be manually operated from outside the lock device 100. The user manually operates the manual operation lever 182 to rotate the helical gear 163. For example, when the motor 161 becomes defective, the user may manually operate the manual operation lever 182 to rotate the helical gear 163 and manually move the hook lock bar restriction portion 122*b* between the hook lock position and the hook unlock position. This avoids a situation in which the power supplying plug 10 cannot be disconnected from the inlet 5.

The present embodiment has the advantages described below.

(1) The coil spring 180 is used to urge the lid lock bar 151 toward the lid lock position. Further, the distal end of the lid lock bar 151 includes the bar guide surface 158, which moves the lid lock bar 151 to the lid unlock position when pushed by the U-shaped plate 41 of the lid 40. Thus, the lid lock bar 151 is moved to the lid lock position and inserted into the latch hole 42 by merely closing the lid 40. This keeps the opening 1*b* closed by the lid 40. In this manner, the same motor 161 can be used to unlock the lid 40 and lock and unlock the hook 16. The motor 161 does not have to be operated when locking the lid 40, and the lid 40 may be locked just by closing the lid 40. This improves convenience.

(2) The helical gear 163 includes the rotor tube 164, which is coaxial with the helical gear 163. The first rotor projection 165, which rotates about the axis of the helical gear 163, is formed on the inner surface of the rotor tube 164. The rotation shaft 125, which is accommodated in the rotor tube 164, is formed on the transmission member 121. The rotation shaft 125 includes the second semicylinder 127, which is arranged in the rotation path of the first rotor projection 165. Due to this structure, when the helical gear 163 rotates clockwise, the first rotor projection 165 engages the second semicylinder 127 and rotates the transmission member 121. The control shaft 122 rotates integrally with the transmission member 121 and moves the hook lock bar restriction portion 122*b* to the hook lock bar position.

(3) The helical gear 163 includes the second rotor projection 173, which rotates around the axis of the helical gear 163. The link bar 152, which is supported by the pivot shaft 118 of the case 101, includes the first engagement pin 154, which is arranged in the rotation path of the second rotor projection 173. The link bar 152 includes the second engagement pin 155 located at the opposite side of the first engagement pin 154. The second engagement pin 155 engages the lid lock bar 151. Thus, the second rotor projection 173 engages the first engagement pin 154 and rotates the link bar 152 only when the helical gear 163 rotates counterclockwise. As a result, the rotation of the link bar 152 moves the second engagement pin 155 and moves the lid lock bar 151 to the lid unlock position.

(4) The C-shaped hook lock bar restriction portion 122*b* is arranged on the control shaft 122, which rotates integrally with the transmission member 121. Further, the hook lock bar restriction portion 122*b* is located in the movement path of the hook lock bar 123 when the hook lock bar 123 moves to the tilted position. Thus, the transmission member 121 is merely rotated to restrict movement of the hook lock bar 123 to the tilted position with the hook lock bar restriction portion 122*b*.

(5) The helical gear 163 includes the arcuate rotor wall 166. The arcuate rotor wall 166 corresponds to the portion where the arcuate stator wall 108 is formed. The arcuate rotor wall 166 and the arcuate stator wall 108 support the first torsion spring 169. Accordingly, when the drive force of the motor 161 rotates the helical gear 163, the first torsion spring 169 is elastically deformed with the two ends of the first torsion spring 169 being supported by the arcuate rotor wall 166 and the arcuate stator wall 108. When the motor 161 stops, the elastic recovery of the first torsion spring 169 returns the helical gear 163 to the reference position. Since the helical gear 163 returns to the reference position, the motor 161 does not have to be driven. This reduces the power consumed by the motor 161.

(6) The manual operation lever 182 rotates integrally with the helical gear 163. The manual operation lever 182 may be operated from outside the lock device 100. The operation of the manual operation lever 182 allows for the rotation of the helical gear 163. This allows the helical gear 163 to be rotated by operating the manual operation lever 182 even when, for example, the motor 161 becomes defective and the drive force of the motor 161 cannot be used to rotate the helical gear 163. That is, the hook lock bar restriction portion 122*b* may be moved between the hook lock position and the hook unlock position, and the lid lock bar 151 may be moved between the lid lock position and the lid unlock position. This avoids a situation in which the power supplying plug 10 cannot be disconnected from the inlet 5.

The above embodiment may be modified as described below.

Figure 17:
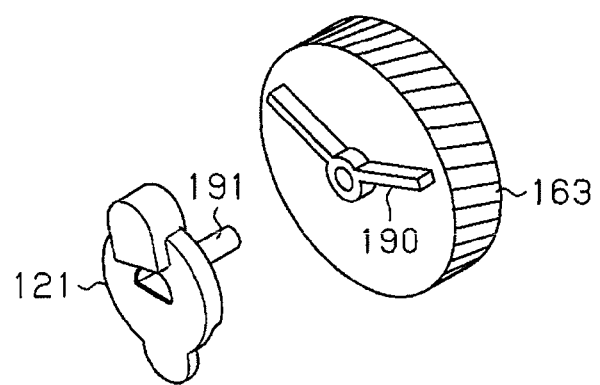
FIG. 17 is an exploded perspective view showing a first modification of the lock device.

In the above embodiment, the helical gear 163 includes the first rotor projection 165, and the transmission member 121 includes the second semicylinder 127. However, this may be reversed. For example, in the example shown in FIG. 17, the helical gear 163 includes a first rotation engagement member 190, which corresponds to the first and second rotation shaft edges 127*a* and 127*b*. Further, the transmission member 121 includes a second rotation engagement member 191, which corresponds to the first rotor projection 165 and is located in the rotation path of the first rotation engagement member 190. This obtains the same advantages as the above embodiment.

In the above embodiment, the first torsion spring 169 is arranged inside the arcuate stator wall 108 and the arcuate rotor wall 166 of the helical gear 163. Instead, the first torsion spring 169 may be arranged outside the arcuate stator wall 108 and the arcuate rotor wall 166 of the helical gear 163. This obtains the same advantages as the above embodiment.

Figure 18A:
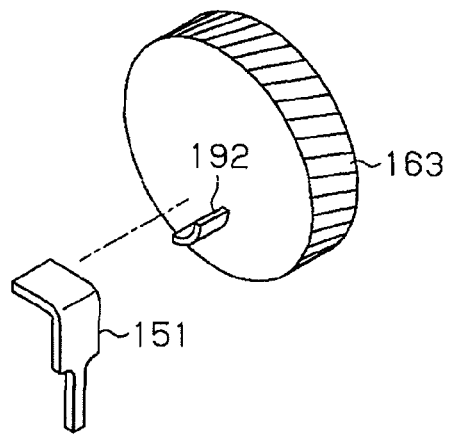
FIG. 18A is a perspective view showing a lid lock bar and a helical gear in a second modification of the lock device.
Figure 18B:
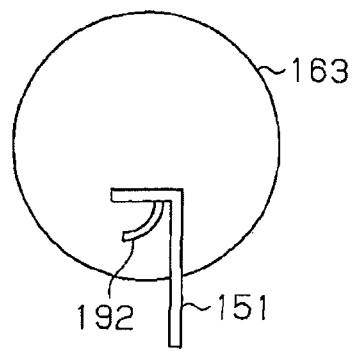
FIG. 18B is a side view of the lid lock bar located at the lid lock position.
Figure 18C:
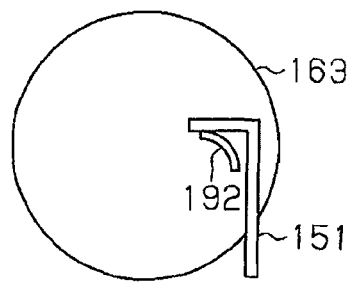
FIG. 18C is a side view of the lid lock bar located at the lid unlock position.

In the above embodiment, the second transmission member is not limited to the link bar 152. For example, in the example shown in FIGS. 18A to 18O, a wall 192 is arranged between the helical gear 163 and the lid lock bar 151 in lieu of the link bar 152. The wall 192 may be formed on the helical gear 163. A portion of the lid lock bar 151 is arranged in the rotation path of the wall 192. In this structure, the rotation of the helical gear 163 allows for the movement of the lid lock bar 151 from the lid lock position shown in FIG. 18B to the lid unlock position shown in FIG. 18C. This obtains the same advantages as the above embodiment.

Figure 19:
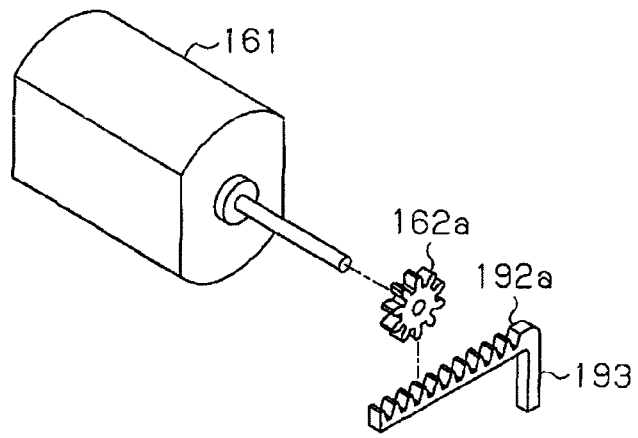
FIG. 19 is an exploded perspective view partially showing a third modification of the lock device.

In the above embodiment, the manual operation lever 182 does not have to directly operate the helical gear 163. For example, in the example shown in FIG. 19, a manual operation lever 193 includes a rack 192*a*, and the rack 192*a* is engaged with a pinion 162*a*, which is coupled to a motor 161. The operation of the manual operation lever 193 rotates the motor shaft. This rotates the worm gear 162, which is fixed to the motor shaft, and rotates the helical gear 163. This structure obtains the same advantages as the above embodiment.

The worm gear 162 may be omitted. In this case, the helical gear 163 is fixed to the motor shaft of the motor 161. This obtains the same advantages as the above embodiment. In this structure, there is no need for the helical gear 163 to be a gear.

In the above embodiment, the first torsion spring 169 may be omitted. For example, a control circuit may perform a motor control program that returns the helical gear 163 to the reference position after the helical gear 163 rotates clockwise. In this case, the same advantages as the above embodiment are obtained.

In the above embodiment, the second torsion spring 115 may be omitted.

In the above embodiment, the third torsion spring 116 may be omitted as long as the hook lock bar 123 may constantly be maintained in a horizontal state by, for example, making the hook lock bar 123 heavier at the outer side than the inner side.

It is preferable that a lid restriction member like the lid lock bar 151 be urged by an urging member like the coil spring 180. In such a structure, the lid restriction member is urged toward the lid lock position. However, the coil spring 180 may be omitted as long as the lid lock bar 151 is constantly urged by its own weight toward the lid lock position.

In the above embodiment, the helical gear 163 and the manual operation lever 182 and the engagement of the transmission member 121 and the manual operation lever 182 are realized by fitting a semi-cylindrical shaft into a semi-cylindrical recess (hole). Instead, a polygonal shaft may be inserted to a recess shaped in conformance with the polygonal shaft. Further, the shaft and the recess may be fixed to each other by an adhesive agent or the like. In these structures, the helical gear 163 and the manual operation lever 182 are rotated integrally with each other, and the transmission member 121 and the control shaft 122 are rotated integrally with each other.

Preferably, the lid 40 is urged by an urging member (not shown) in a direction that opens the opening 1b. However, the urging member may be omitted.

The inlet 5 of the vehicle 1 is not limited to the side surface of the vehicle 1. For example, the inlet 5 may ne arranged in a front surface of the vehicle.

In the above embodiment, the hook 16 is arranged above the power supplying end 14. The hook 16 may be arranged at a plurality of locations on the power supplying end 14, such as on the upper and lower portions of the power supplying end 14.

In the above embodiment, the hook 16 is formed on the power supplying plug 10, and the hook seat 21 is arranged on the inlet 5. This may be reversed.

In the above embodiment, the motor 161 is used as the driving means. However, another driving means such as a rotary solenoid may be used.

In the above embodiment, key authentication is performed through the ID verification of the electronic key 80. Instead, key authentication may be performed through mechanical verification of a mechanical key.

In the above embodiment, the electronic key system 70 may employ an immobilizer system that uses a transponder to transmit the ID code.

In the above embodiment, the frequency used by the electronic key system 70 is not necessarily limited to LF and UHF and other frequencies may be used. Further, the frequency for transmitting radio waves to the electronic key 80 from the vehicle and the frequency for returning radio waves to the vehicle 1 from the electronic key 80 do not necessarily have to be different and may be the same.

In the above embodiment, user authentication is not necessarily limited to the key verification that uses the electronic key 80. For example, a different verification such as biometric verification may be performed.

The above embodiment is applied to the inlet 5 of the plug-in hybrid vehicle 1. Instead, the above embodiment may be applied to the inlet of an electric vehicle.

In the above embodiment, the lock device 100 of the present example is not necessarily applied to only the vehicle 1. The lock device 100 may be applied to any apparatus or appliance that includes a rechargeable battery.

The above modifications may be combined with each other or with the preferred embodiment.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

The invention claimed is:

1. A lock device that locks a lid and a power supplying plug, wherein the lid protects a power reception connector, the lock device comprising:
    a plug restriction member that moves between a plug lock position and a plug unlock position, wherein the plug restriction member restricts removal of the power supplying plug from the power reception connector at the plug lock position, and the plug restriction member permits removal of the power supplying plug from the power reception connector at the plug unlock position;
    a lid restriction member that moves between a lid lock position and a lid unlock position, wherein the lid restriction member engages the lid and restricts opening of the lid at the lid lock position, the lid restriction member permits opening of the lid at the lid unlock position, and the lid restriction member is constantly urged toward the lid lock position;
    a drive mechanism including a drive source and a rotating body, wherein the drive source generates drive force and rotates the rotating body in first and second directions from a reference position; and
    a recovery mechanism connected to or formed integrally with the rotating body to return the rotating body to the reference position when the rotating body rotates in the second direction,
    wherein the drive mechanism is directly or indirectly connected to the plug restriction member to move the plug restriction member from the plug unlock position to the plug lock position when the rotating body rotates from the reference position in the first direction,
    the drive mechanism is directly or indirectly connected to the lid restriction member to move the lid restriction member from the lid lock position to the lid unlock position against an urging force acting on the lid restriction member when the rotating body rotates from the reference position in the second direction,
    when closing the lid with the lid restriction member held at the lid lock position, the lid restriction member engages the closing lid and moves toward the unlock position thereby permitting the lid to close, and
    the lid restriction member is formed to be returned to the lid lock position by the urging force at a timing at which the lid reaches a close position.

2. The lock device according to claim 1, further comprising a first transmission member arranged between the drive mechanism and the plug restriction member, wherein:
    the rotating body includes a first rotation engagement portion that rotates about an axis of the rotating body, the first transmission member includes a second rotation engagement portion located in a rotation path of the first rotation engagement portion, and the plug restriction member moves between the plug lock position and the plug unlock position when the first transmission member moves.

3. The lock device according to claim 1, further comprising a second transmission member arranged between the drive mechanism and the lid restriction member, wherein the rotating body includes a third rotation engagement portion that rotates about an axis of the rotating body, the second transmission member includes a fourth rotation engagement portion located in a rotation path of the third rotation engagement portion, and the lid restriction member moves between the lid lock position and the lid unlock position when the second transmission member moves.

4. The lock device according to claim 2, further comprising a second transmission member arranged between the drive mechanism and the lid restriction member, wherein the rotating body includes a third rotation engagement portion that rotates about an axis of the rotating body, the second transmission member includes a fourth rotation engagement portion located in a rotation path of the third rotation engagement portion, and the lid restriction member moves between the lid lock position and the lid unlock position when the second transmission member moves.

5. The lock device according to claim 2, wherein the power supplying plug includes a movable hook, the power reception connector includes a cooperative member that moves in cooperation with the hook and a hook seat, which engages the hook, the first transmission member rotates integrally with the rotating body when the first rotation engagement portion engages the second rotation engagement portion of the first transmission member, and the plug restriction member rotates integrally with the first transmission member and moves between the plug lock position, which is located in a movement path of the cooperative member, and the plug unlock position, which is separated from the movement path.

6. The lock device according to claim 1, wherein the recovery mechanism includes:

a first torsion spring;

a first support that supports one or two ends of the first torsion spring, wherein the first support is formed on the rotating body; and a second support that supports one or two ends of the first torsion spring, wherein the second support is formed on a first immovable portion arranged separately from the rotating body, wherein the first and second supports support each end of the first torsion spring from the same direction when the rotating body is located at the reference position.

7. The lock device according to claim 5, further comprising a second torsion spring, wherein the second torsion spring includes one end supported by the first transmission member and another end supported by a second immovable portion arranged separately from the first transmission member.

8. The lock device according to claim 1, further comprising a manual operation portion manually operated to rotate the rotating body from outside the lock device.

9. The lock device according to claim 1, wherein the recovery mechanism includes:

a first support including first and second movable ends that are moved when the rotating body rotates;

a second support including first and second immovable ends that are not moved when the rotating body rotates; and an elastic member including one end, which is supported by one or both of the first movable end of the first support and the first immovable end of the second support, and another end, which is supported by one or both of the second movable end of the first support and the second immovable end of the second support, wherein when the rotating body rotates in the second direction, distance between the two ends of the elastic member is changed to generate elastic repulsion force that urges the rotating body in the first direction.

* * * * *